United States Patent [19]
Taga et al.

[11] Patent Number: 5,973,460
[45] Date of Patent: Oct. 26, 1999

[54] POWER OUTPUT APPARATUS AND METHOD OF CONTROLLING THE SAME

[75] Inventors: Yoshiaki Taga, deceased, late of Aichi-gun; Shigeo Taga, heir; Takiko Taga, heir, both of Tokorozawa; Tomoyo Taga, heir, Nagoya; Tomohiro Oda, Nishikamo-gun; Yasutomo Kawabata, Aichi-gun; Ryuji Toh, Toyota; Eiji Yamada, Owariasahi, all of Japan

[73] Assignee: Toyota Jidosha Kabushiki Kaisha, Toyota, Japan

[21] Appl. No.: 08/813,360

[22] Filed: Mar. 7, 1997

[30] Foreign Application Priority Data

Mar. 26, 1996 [JP] Japan ..................................... 8-097468

[51] Int. Cl.$^6$ ........................................................ H02P 1/00
[52] U.S. Cl. ............................ 318/139; 318/34; 318/254; 318/138; 318/439
[58] Field of Search .............................. 318/139, 34, 254, 318/138, 798–815, 439; 322/16

[56] References Cited

U.S. PATENT DOCUMENTS

| | | |
|---|---|---|
| 3,623,568 | 11/1971 | Mori . |
| 3,683,249 | 8/1972 | Shibata . |
| 3,789,281 | 1/1974 | Shibata . |
| 5,487,438 | 1/1996 | Kinoshita ............................... 318/34 X |
| 5,574,340 | 11/1996 | Bisel et al. ................................. 318/34 |
| 5,689,174 | 11/1997 | Pacheco, Sr. .......................... 322/16 X |

FOREIGN PATENT DOCUMENTS

| | | |
|---|---|---|
| 58401 73 | 1/1975 | Australia . |
| A1-0 576 945 | 1/1994 | European Pat. Off. . |
| 0 725 474 | 8/1996 | European Pat. Off. . |
| 2 630 868 | 11/1989 | France . |
| 30 41 867 | 6/1982 | Germany . |
| 53-133814 | 11/1978 | Japan . |
| 8-126116 | 5/1996 | Japan . |
| 8-140215 | 5/1996 | Japan . |

*Primary Examiner*—Karen Masih
*Attorney, Agent, or Firm*—Oliff & Berridge, PLC

[57] ABSTRACT

A power output apparatus of the invention includes a clutch motor (30) and an assist motor (40) that allow energy output from an engine (50) driven at a driving point of high efficiency to be converted to energy expressed as the product of a revolving speed and a torque of a drive shaft (22) and to be output to the drive shaft (22). In case that a large torque is required, for example, when the vehicle starts on a rising slope or runs at a low speed, the engine (50) is driven at a high-energy driving point having a large torque and a high efficiency. This structure causes large electric power to be generated by excess energy greater than the energy generally consumed and enables a battery (94) to be charged with the large electric power. The power output apparatus of the invention further has functions of predicting the process of charging the battery (94) with the large electric power based on a driving state of the vehicle and topographical information and lowering the remaining charge of the battery (94) in advance according to the requirements. This process effectively prevents the battery (94) from being damaged with excess charging.

26 Claims, 27 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More concretely, the present invention pertains to a power output apparatus for outputting power generated by an engine to a drive shaft with a high efficiency and a method of controlling such a power output apparatus.

2. Description of the Prior Art

In known power output apparatuses mounted on a vehicle, an output shaft of an engine is electromagnetically linked with a drive shaft, which connects with a rotor of a motor, by means of an electromagnetic coupling, so that power of the engine is transmitted to the drive shaft (as disclosed in, for example, JAPANESE PATENT LAYING-OPEN GAZETTE No. 53-133814). In this prior art power output apparatus, the motor starts driving the vehicle. When the revolving speed of the motor reaches a predetermined level, an exciting current is given to the electromagnetic coupling to crank the engine, simultaneously with a supply of fuel to the engine and ignition with a spark, so that the engine starts its operation. After the start of the engine, the power output from the engine is transmitted to the drive shaft via the electromagnetic coupling to run the vehicle. When the power transmitted to the drive shaft via the electromagnetic coupling does not satisfy the required power of the drive shaft, the motor is driven to supplement the insufficiency. While transmitting the power to the drive shaft, the electromagnetic coupling regenerates electric power corresponding to a slip of its electromagnetic linkage. The regenerated electric power is stored in a battery to be used for starting the vehicle, or is used as power of the motor to supplement the insufficient power of the drive shaft.

This power output apparatus requires a motor having a large output torque. Only the power from the motor is used to start or launch the vehicle, and the motor with a large output torque is accordingly required for sufficient acceleration. Taking into account the starting operation on a rising slope, the motor is required to have a greater output torque. The motor having a large output torque is generally rather bulky and undesirably increases the size of the whole power output apparatus. This is especially not suitable when the power output apparatus is mounted on a limited space, such as a vehicle. The battery that supplies electric power to the motor is also required to have a large capacity and thereby has a relatively large size.

The applicant has invented a technique (not filed) of enabling the power output from an engine which starts its operation before a start of the vehicle to be transmitted to a drive shaft via an electromagnetic coupling, as well as addition of the power from a motor to the drive shaft. This lowers the required output torque of the motor and makes the whole power output apparatus relatively compact. At the moment of starting the vehicle, the revolving speed of the drive shaft is extremely small, so that the electric power regenerated by the electromagnetic coupling becomes greater than the electric power consumed by the motor. This may result in excess charging and damage the battery.

SUMMARY OF THE INVENTION

One object of the present invention is to provide a power output apparatus that realizes a sufficient output at a time of starting the vehicle without damaging the battery, as well as a method of controlling such a power output apparatus.

In another object of the present invention, the power output apparatus has small-sized motors, at least one battery and a controller for controlling the power output apparatus.

At least part of the above objects is realized by a first power output apparatus mounted on a vehicle for outputting power to a drive shaft of the vehicle of the present invention. The first power output apparatus has an engine having an output shaft and a first motor. The first motor has a first rotor connected with the output shaft of the engine and a second rotor connected with the drive shaft, the second rotor being coaxial to and rotatable relative to the first rotor. Additionally, the first and second rotors are electromagnetically connected with reach other, resulting in power transmitted between the output shaft of the engine and the drive shaft via an electromagnetic coupling of the first rotor with the second rotor. A first motor-driving circuit controls the degree of electromagnetic coupling of the first rotor with the second rotor in the first motor and regulates the rotation of the second rotor relative to the first rotor. A second motor is connected with the drive shaft and has a second motor-driving circuit for driving and controlling the second motor. The storage battery is connected with the first motor-driving circuit and the second motor-driving circuit, and the storage battery is charged with electric power and discharged to release electric power via the first and second motor driving circuits. The output state of the power to the drive shaft corresponding to a predetermined output state based on the running state of the vehicle may be measured or predicted, the predetermined output state representing the output state accompanied by a process of charging the storage battery with electric power that is equal to or greater than a predetermined electric power. A controller is used to control the engine, and for controlling both the first motor and the second motor via the first and second motor driving circuits, respectively, allowing the storage battery to be charged at least with the predetermined electric power.

The term "vehicle" represents general automobiles running on a road surface without a track, train cars running on a railway, special vehicles such as cranes and forklift trucks, and industrial machines.

In the first embodiment of the power output apparatus of the present invention, when the predetermined output state of the power to the drive shaft, which is accompanied by a process of charging the storage battery with electric power that is equal to or greater than a predetermined electric power, is expected, the storage battery can be charged at least with the predetermined electric power. This structure effectively prevents the storage battery from being damaged by excessive charging, and avoids an undesirable state where power cannot be output due to a full charge of the storage battery. The power of the engine is output to the drive shaft via the first motor, and the power of the second motor is output to the drive shaft. In this manner, the power required by the vehicle is supplied to the drive shaft by both the engine and the second motor. Compared with a conventional structure where only the second motor supplies the required power to the drive shaft, the structure of the present invention can reduce the size of the second motor. Part or all of the electric power required of the second motor is compensated by the electric power regenerated by the first motor. Consequently, this reduces the size of the storage battery, compared with conventional structure where all the required electric power depends upon energy stored in the storage battery.

Additionally, the running state of the vehicle is detected by a running state detector. The running state of the vehicle represents a state in which the vehicle is running on a slope having a predetermined or greater rising gradient, the predetermined output state in a predetermined time period can be predicted. This allows the output state of the power accompanied by the process of charging the storage battery with excess electric power, for example, a start or a low-speed drive of the vehicle on a rising slope, to be more readily predicted. These conditions represent the output state of the power accompanied with the process of charging the storage battery with excess electric power. This is because the power required to be output to the drive shaft has a large torque but a small revolving speed, whereas a predetermined revolving speed is essential for outputting a large torque from the engine.

Furthermore, the first power output apparatus has a position/direction detector containing map information, which can detect a current position and a running direction of the vehicle in relation to the map information. A power predictor predicts the predetermined output state, based on the running state of the vehicle detected by the running state detector and the current position and the running direction of the vehicle detected in relation to the map information by the position/direction detector. This structure allows the predetermined output state of the power, which is accompanied by the process of charging the storage battery with excess electric power, to be more accurately predicted.

Additionally, the first motor and the second motor are constructed as a complex motor that has a third rotor connected with the output shaft of the engine, a fourth rotor connected with the drive shaft to be coaxial to and rotatable relative to the third rotor, and a stator for rotating the fourth rotor. The third rotor and the fourth rotor constitute the first motor having the first rotor and the second rotor whereas the fourth rotor and the stator constitute the second motor. The integral structure of the first motor and the second motor reduces the size of the whole power output apparatus.

A second embodiment of the present invention is similar to the first embodiment, except that the second motor is connected with the output shaft of the engine instead of the drive shaft. Additionally, the third rotor and the stator constitute the second motor.

In a third embodiment of the present invention, the second motor is connected with the drive shaft as in the first embodiment. In one aspect of the third embodiment, the map information of the position/direction detector has specific information regarding a specific area that generates the predetermined output state and requires the vehicle to run on a slope having a predetermined or greater rising gradient. When the current position of the vehicle corresponds to the specific area that generates the predetermined output state and is included as the specific information in the map information, the predetermined output state that would be expected in a predetermined time period is predicted.

In another aspect of the third embodiment, when the vehicle is expected to enter the specific area at a predetermined time based on the current position and running direction of the vehicle, the power predictor predicts the predetermined output state that would be expected in the predetermined time.

In yet another aspect of the third embodiment, the map information stored in the position/direction detector stores data regarding slopes on a driving route of the vehicle as specific information. When the vehicle is running on a slope having a predetermined or greater rising gradient based on the map information, the current position and running direction, the predetermined output state that would be expected in a predetermined time period is predicted. This structure allows the predetermined output state of the power to be more accurately predicted at an earlier stage.

Additionally, the first motor and the second motor constructed as a complex motor having a third rotor connected with the output shaft of the engine, a fourth rotor connected with the drive shaft to be coaxial to and rotatable relative to the third rotor, and a stator for rotating the fourth rotor. The third rotor and the fourth rotor constitute the first motor comprising the first rotor and the second rotor whereas the fourth rotor and the stator constitute the second motor. This integral structure of the first motor and the second motor reduces the size of the whole power output apparatus.

A fourth embodiment of the present invention is similar to the third embodiment, except that the second motor is connected with the output shaft of the engine, the first motor and the second motor are constructed as a complex motor that has a third rotor connected with the output shaft of the engine, a fourth rotor connected with the drive shaft to be coaxial to and rotatable relative to the third rotor, and a stator for rotating the fourth rotor. The third rotor and the fourth rotor constitute the first motor having the first rotor and the second rotor whereas the third rotor and the stator constitute the second motor. This integral structure of the first motor and the second motor reduces the size of the whole power output apparatus.

In a fifth embodiment of the present invention, the second motor is connected with the drive shaft. The first motor and the second motor are constructed as a complex motor that having a third rotor connected with the output shaft of the engine, a fourth rotor connected with the drive shaft to be coaxial to and rotatable relative to the third rotor, and a stator for rotating the fourth rotor, the third rotor and the fourth rotor constituting the first motor having the first rotor and the second rotor whereas the first rotor and the stator constitute the second motor. Additionally, a power consumer is electrically connected with the first motor-driving circuit and the second motor-driving circuit, the power consumer consuming at least part of the electric power regenerated via at least one of the first motor-driving circuit and the second motor-driving circuit. An output state detector detects an output state of the power to the drive shaft by the engine, the first motor, and the second motor. When the output state of the power is accompanied by a process of charging the storage battery with electric power that is greater than a predetermined electric power, an electric power controller controls the first motor-driving circuit, the second motor-driving circuit, and the power consumer, in order to supply the predetermined electric power to the storage battery which is thereby charged with the supplied electric power, while supplying the surplus power to the power consumer.

Even when the predetermined output state of the power, which is accompanied with the process of charging the storage battery with excess electric power, occurs, this embodiment supplies surplus electric power to the power consumer for consumption. This structure effectively prevents the storage battery from being damaged by excessive charging, and avoids an undesirable state that cannot output the power due to a full charge of the storage battery. While the power of the engine is output to the drive shaft via the first motor, the power of the second motor is output to the drive shaft. Thus, the required power is supplied to the drive shaft by both the engine and the second motor.

A sixth embodiment of the present invention is similar to the fifth embodiment, except that the second motor is connected with the output shaft of the engine. The first motor and the second motor are constructed as a complex motor that constitutes a third rotor connected with the output shaft of the engine, a fourth rotor connected with the drive shaft to be coaxial to and rotatable relative to the third rotor, and a stator for rotating the fourth rotor, the third rotor and the fourth rotor constituting the first motor comprising the first rotor and the second rotor whereas the third rotor and the stator constitute the second motor.

In a seventh embodiment of the present invention, the second motor is connected with the drive shaft. The first motor and the second motor are constructed as a complex motor that comprises a third rotor connected with the output shaft of the engine, a fourth rotor connected with the drive shaft to be coaxial to and rotatable relative to the third rotor, and a stator for rotating the fourth rotor, the third rotor and the fourth rotor constituting the first motor having the first rotor and the second rotor whereas the fourth rotor and the stator constitute the second motor. A power controller controls the engine in order to decrease the revolving speed of the output shaft without varying the torque output from the engine to the output shaft of the engine. This decreases energy of the power output from the engine, thereby reducing the electric power used for charging the storage battery.

An eighth embodiment of the present invention is similar to the seventh embodiment, except that the second motor is connected to the output shaft of the engine. The first motor and the second motor being constructed as a complex motor that constitutes a third rotor connected with the output shaft of the engine, a fourth rotor connected with the drive shaft to be coaxial to and rotatable relative to the third rotor, and a stator for rotating the fourth rotor, the third rotor and the fourth rotor constituting the first motor having the first rotor and the second rotor whereas the third rotor and the stator constitute the second motor.

At least part of the above objects is also realized by a first method of controlling a power output apparatus mounted on a vehicle for outputting power to a drive shaft. The first method detects the running state of the vehicle, predicts an output state of the power to the drive shaft corresponding to a predetermined output state based on the running state of the vehicle, and controls the engine, the first motor, and the second motor, so as to allow the storage battery to be charged at least with the predetermined electric power, with the predetermined output state that is expected. Thus, when the predetermined output state of the power to the drive shaft, which is accompanied by a process of charging the storage battery with electric power that is equal to or greater than a predetermined electric power, is expected, the storage battery is allowed to be charged at least with the predetermined electric power. This effectively prevents the storage battery from being damaged by excessive charging, and avoids an undesirable state that cannot output the power due to a full charge of the storage battery. While the power of the engine is output to the drive shaft via the first motor, the power of the second motor is also output to the drive shaft. Thus, the required power is supplied to the drive shaft by both the engine and the second motor, the structure thereby reducing the size of the second motor over conventional structures. Part or all of the electric power required by the second motor is compensated by the electric power generated by the first motor, thereby reducing the size of the storage battery when compared to conventional structures.

The present invention is further directed to a second method of controlling the power output apparatus mounted on a vehicle for outputting power to a drive shaft. The second method detects a current position and a running direction of the vehicle in relation to map information, predicts an output state of the power to the drive shaft corresponding to a predetermined output state based on the current position and the running direction of the vehicle detected in relation to the map information, and controls the engine, the first motor, and the second motor, so as to allow the storage battery to be charged at least with the predetermined electric power, when the predetermined output state is expected. In the second method, when the predetermined output state of the power to the drive shaft, which is accompanied by a process of charging the storage battery with electric power that is equal to or greater than a predetermined electric power, is expected, the storage battery is allowed to be charged at least with the predetermined electric power. This effectively prevents the storage battery from being damaged by excessive charging, and avoids an undesirable state that cannot output the power due to a full charge of the storage battery. The prediction of the running state of the vehicle is determined based on the current position and the running direction of the vehicle as well as the map information. This enables the output state of the power accompanied by the process of charging the storage battery means with excess electric power to be more accurately and readily predicted. Furthermore, the power of the engine is output to the drive shaft via the first motor and the power of the second motor is also output to the drive shaft. Thus, the required power is supplied to the drive shaft by both the engine and the second motor.

The present invention is further directed to a third method of controlling a power output apparatus mounted on a vehicle for outputting power to a drive shaft. The third method detects an output state of the power to the drive shaft by the engine, the first motor, and the second motor, and controls the first motor, the second motor and the power consumer, when the output state of the power detected is accompanied by a process of charging the storage battery with electric power that is equal to or greater than a predetermined electric power, in order to supply the predetermined electric power to the storage battery which is thereby charged with a supply of electric power, while supplying the surplus power to the power consumer. Thus, even when the predetermined output state of the power, which is accompanied with the process of charging the storage battery with excess electric power, occurs, the third method according to the present invention supplies surplus electric power to a power consumer for consumption. This effectively prevents the storage battery from being damaged by excessive charging, and avoids an undesirable state that cannot output the power due to a full charge of the storage battery. When the power of the engine is output to the drive shaft via the first motor, the power of the second motor is also output to the drive shaft. Thus, the required power is supplied to the drive shaft by both the engine and the second motor.

The present invention is further directed to a fourth method for controlling a power output apparatus mounted on a vehicle for outputting power to a drive shaft. The fourth method detects an output state of the power to the drive shaft by the engine, the first motor, and the second motor, and controls the engine, the first motor, and the second motor, when the output state of the detected power is accompanied by a process of charging the storage battery with electric power that is equal to or greater than a predetermined electric power, in order to change the output state of the power to a specific state accompanied by a process of charging the storage battery with electric power not greater than the predetermined electric power, without varying the power output to the drive shaft. Thus, the fourth method changes the output state of the power to a specific state which is accompanied by the process of charging the storage battery with electric power that is not greater than the chargeable level, without varying the power output to the drive shaft. This structure effectively prevents the storage battery from being damaged by excessive charging, and avoids an undesirable state that cannot output the power due to a full charge of the storage battery.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
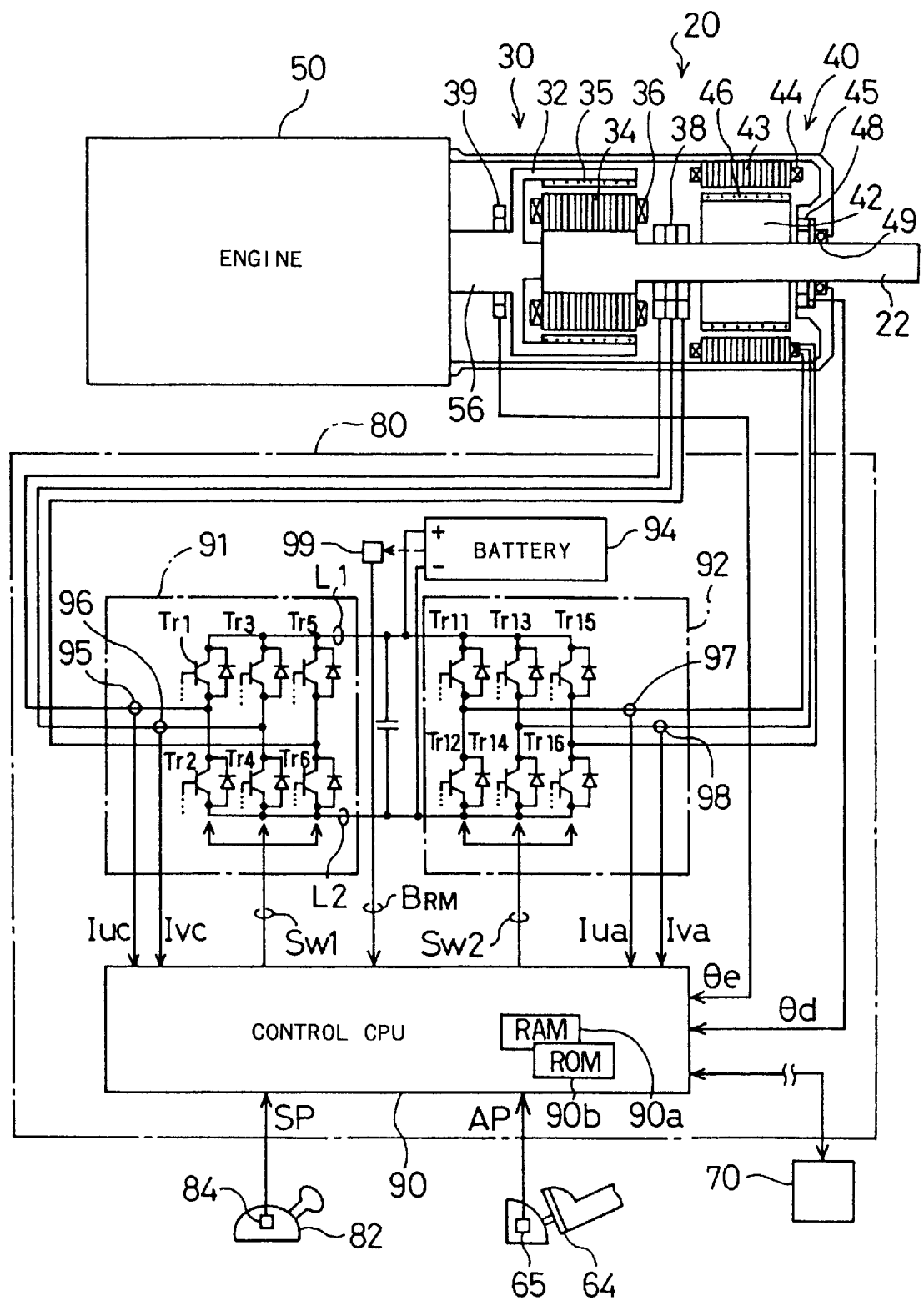
FIG. 1 is a schematic view illustrating structure of a power output apparatus 20 as a first embodiment according to the present invention.
Figure 2:
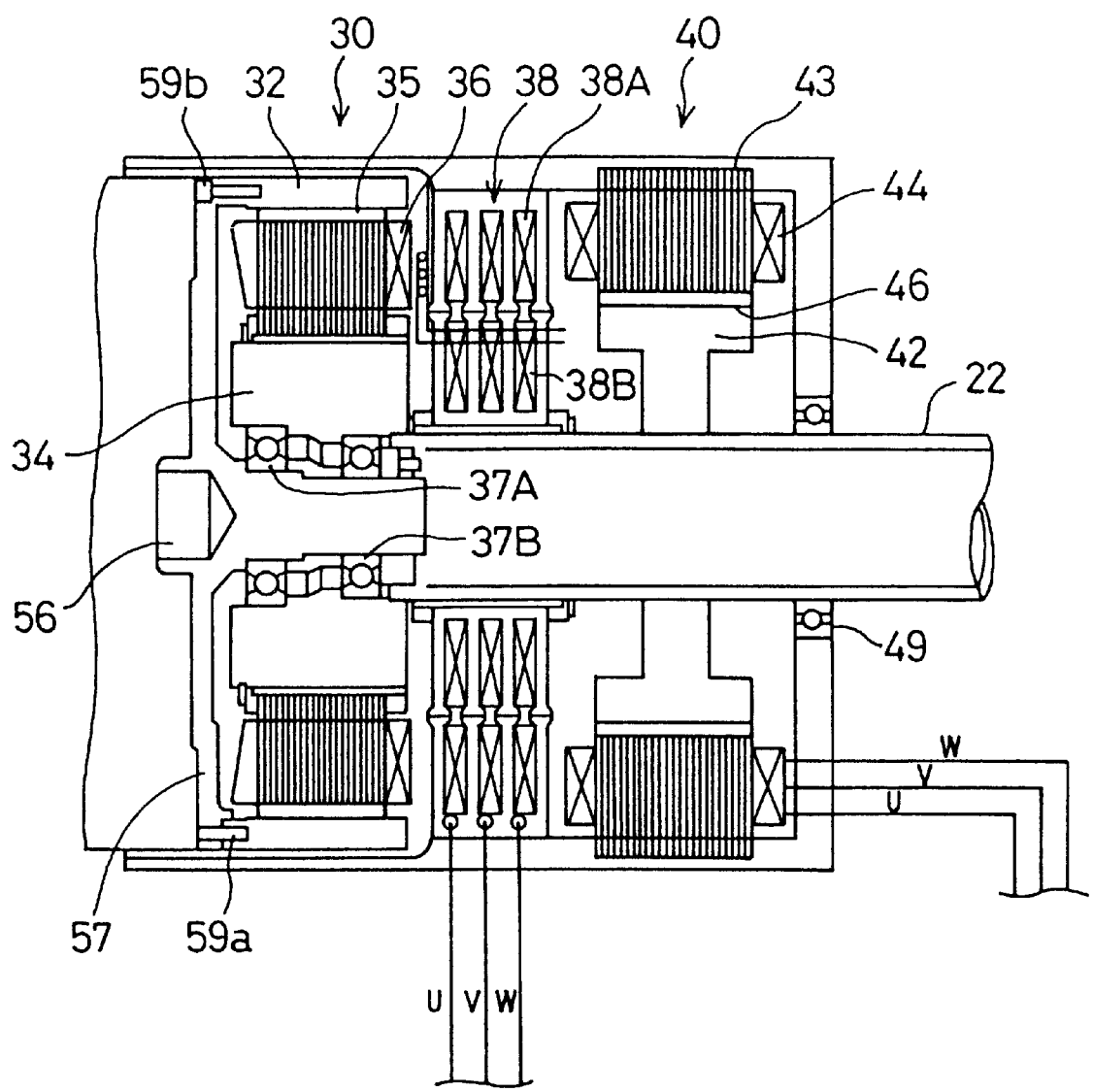
FIG. 2 is a cross sectional view illustrating detailed structures of a clutch motor 30 and an assist motor 40 included in the power output apparatus 20 of FIG. 1.
Figure 3:
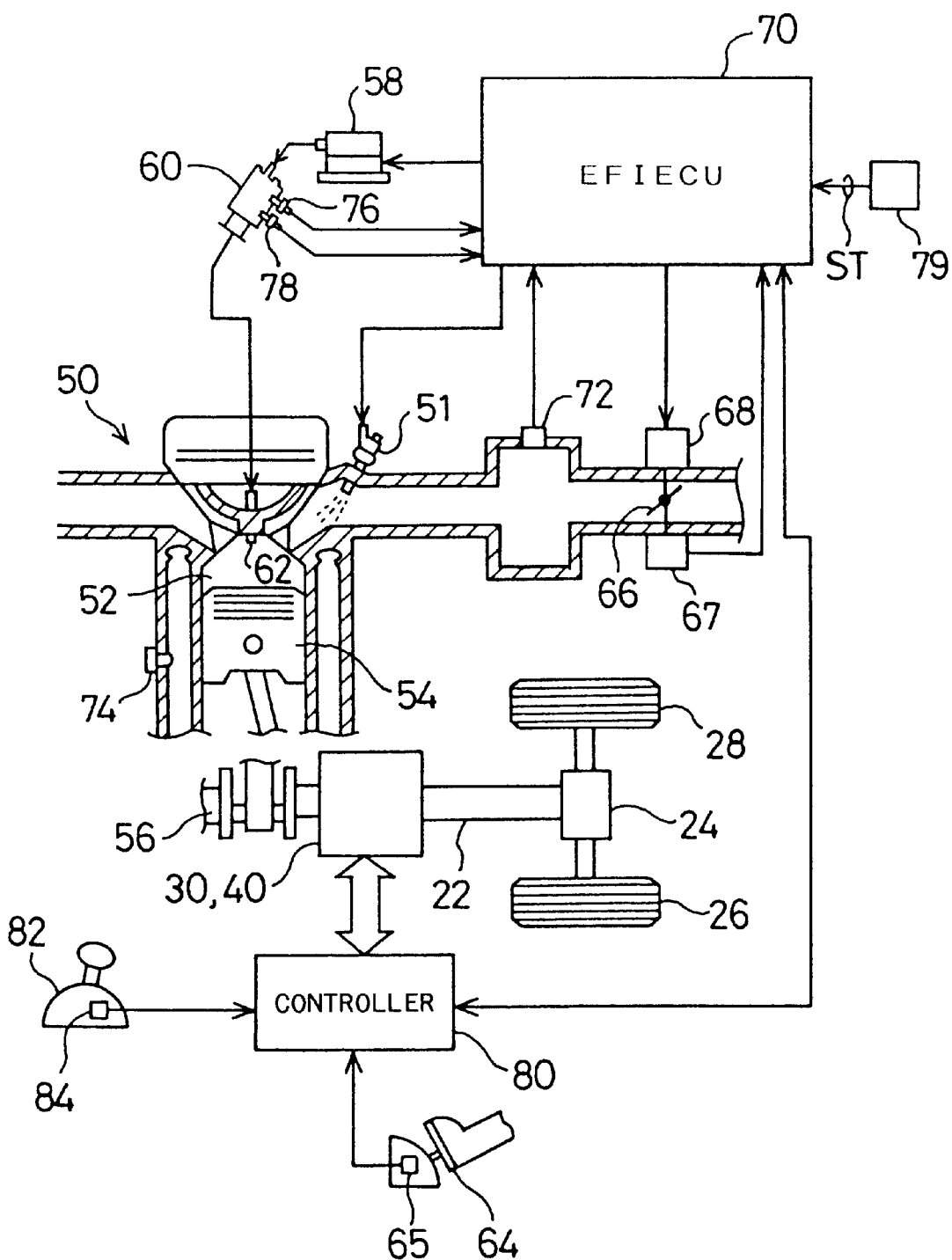
FIG. 3 is a schematic view illustrating general structure of a vehicle with the power output apparatus 20 of FIG. 1 incorporated therein.

Modes of carrying out the present invention are described hereafter as preferred embodiments. FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first for the convenience of description.

Referring to FIG. 3, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting a valve travel or position BP of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed (the number of revolutions per a predetermined time period) and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the engine 50 for generating power, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the engine 50, whereas the inner rotor 34 thereof is mechanically linked with the rotor 42 of the assist motor 40.

Structures of the clutch motor 30 and the assist motor 40 are described briefly. As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. Laminated sheets of non-directional electromagnetic steel are used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a revolving magnetic field. The stator 43 is also made of laminated sheets of non-directional electromagnetic steel. A plurality of permanent magnets 46 are attached to an outer surface of the rotor 42. In the assist motor 40, interaction between a magnetic field formed by the permanent magnets 46 and a revolving magnetic field formed by the three-phase coils 44 results in rotations of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. The rotation and axial torque of the crankshaft 56 of the engine 50 are accordingly transmitted via the outer rotor 32 and the inner rotor 34 of the clutch motor 30 to the drive shaft 22 while the rotation and torque of the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 mounted thereon and the inner rotor 34 with the three-phase coils 36 attached thereto. The detailed structure of the clutch motor 30 is described according to the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, eight in this embodiment, are attached to the inner surface of the outer rotor 32 as mentioned previously. The permanent magnets 35 are magnetized in the direction towards the axial center of the clutch motor 30 and have magnetic poles of alternately inverted directions. The three-phase coils 36 of the inner rotor 34 facing to the permanent magnets 35 across a little gap are wound on a total of 12 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38A fixed to the casing 45 and secondary windings 38B attached to the drive shaft 22 coupled with the inner rotor 34. Electromagnetic induction enables electric power to be transmitted from the primary windings 38A to the secondary windings 38B or vice versa. The rotary transformer 38 has windings for the three phases, that is, U, V, and W phases, to allow for the transmission of three-phase electric currents.

Interaction between a magnetic field formed by one adjoining pair of permanent magnets 35 and a revolving magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (the number of revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later, based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data via the input port. The input data include a rotational angle θe of the crankshaft 56 of the engine 50 measured with the resolver 39, a rotational angle θd of the drive shaft 22 measured with the resolver 48, an accelerator pedal position AP (step-on amount of the accelerator pedal 64) output from the accelerator position sensor 65, a gearshift position SP output from the gearshift position sensor 84, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines L1 and L2. The three-phase coils (U,V,W) 36 of the clutch motor 30 are connected via the rotary transformer 38 to the respective contacts of the paired transistors. The power lines L1 and L2 are respectively connected to plus and minus terminals of the battery 94. The first control signal SW1 output from the control CPU 90 thus successively controls the power-on time of the paired transistors Tr1 through Tr6. The electric current flowing through each coil 36 undergoes PWM (pulse width modulation) to give a quasi-sine wave, which enables the three-phase coils 36 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

The power output apparatus 20 thus constructed works in accordance with the operation principles discussed below, especially with the principle of torque conversion. By way of example, it is assumed that the engine 50 driven by the EFIECU 70 rotates at a revolving speed Ne that is equal to a predetermined value N1. While the transistors Tr1 through Tr6 in the first driving circuit 91 are in OFF position, the controller 80 does not supply any electric current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current flows through the three-phase coils 36 of the clutch motor 30, based on the difference between the revolving speed Ne of the crankshaft 56 of the engine 50 and a revolving speed Nd of the drive shaft 22 (in other words, a difference Nc (=Ne−Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the engine 50 (revolving speed of the crankshaft 56). In this state, the clutch motor 30 functions as a generator, that is, carries out the regenerative operation to regenerate an electric current via the first driving circuit 91 and charges the battery 94 with the electric power thus regenerated. In order to callow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
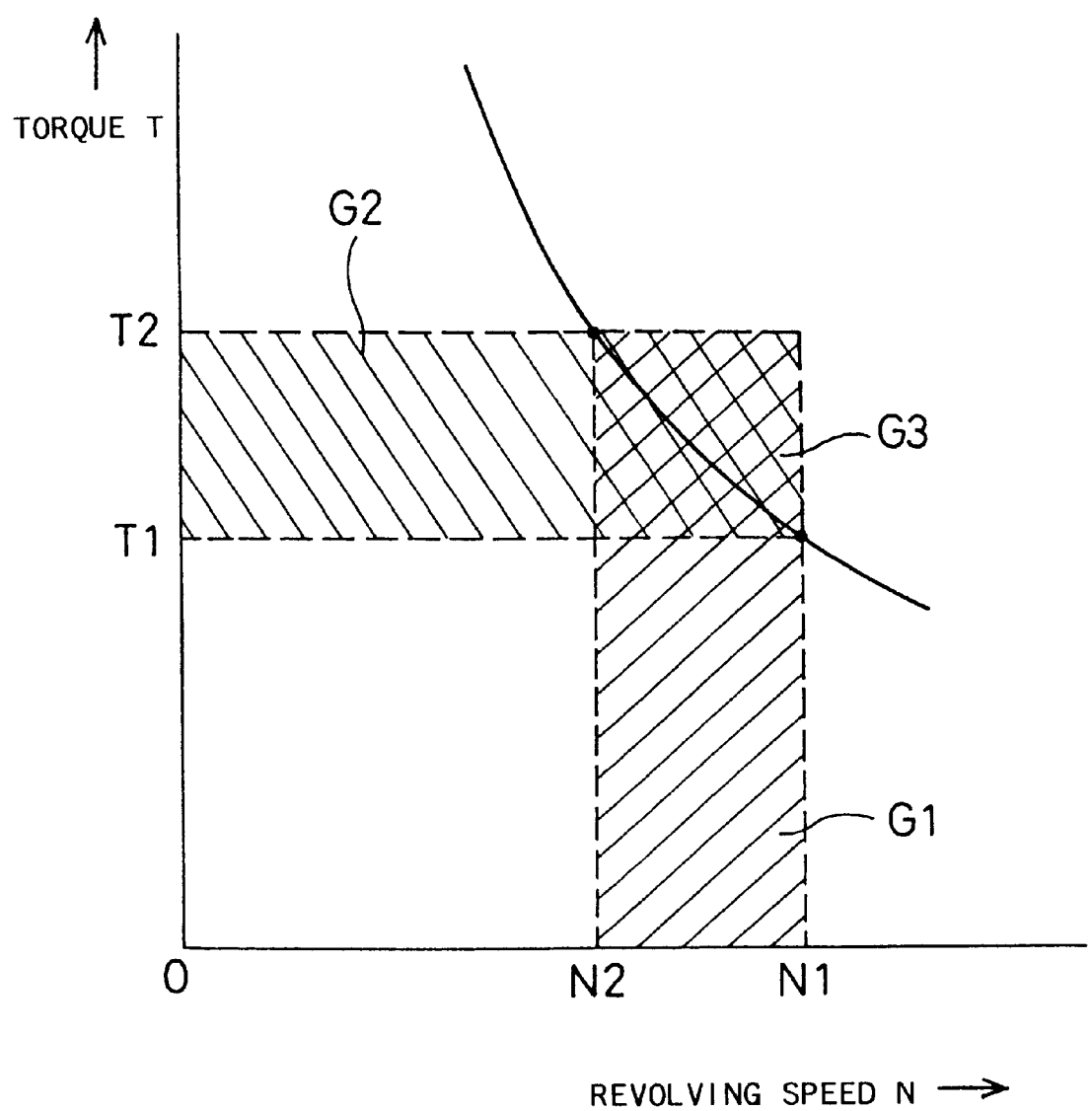
FIG. 4 is a graph showing the operation principle of the power output apparatus 20.

Referring to FIG. 4, when the crankshaft 56 is driven at a revolving speed N1 and with a torque T1, the clutch motor 30 carries out the regenerative operation to produce energy defined by an area G1. The energy of the area G1 is supplied to the assist motor 40, so as to rotate the drive shaft 22 at a revolving speed Nd=N2 with a torque Td=T2. The torque conversion is carried out in the manner discussed above, and the energy corresponding to the slip in the clutch motor 30 or the positive revolving speed difference Nc (=Ne−Nd) is consequently given as a torque to the drive shaft 22.

In accordance with another example, it is assumed that the engine 50 is driven at the revolving speed Ne equal to a value N2 and with the torque Te equal to a value T2, while the drive shaft 22 is rotated at a revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne−Nd). The clutch motor 30 accordingly functions as a normal motor and consumes electric power supplied from the battery 94 to give the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the electric power regenerated by the assist motor 40, the control CPU 90 controls both the first driving circuit 91 and the second driving circuit 92. This enables the clutch motor 30 to be driven without using electric power stored in the battery 94.

Referring back to FIG. 4, when the crankshaft 56 is driven at a revolving speed Ne=N2 and with a torque Te=T2, the assist motor 40 regenerates energy corresponding to the sum of areas G2 and G3. The energy of the areas G2 and G3 is supplied to the clutch motor 30, so as to rotate the drive shaft 22 at the revolving speed Nd=N1 and with the torque Td=T1.

Other than the torque conversion discussed above, the power output apparatus 20 of the embodiment can charge the battery 94 with an excess of electrical energy or discharge the battery 94 to supplement the electrical energy. This is implemented by controlling the output energy from the engine 50 (that is, the product of the torque Te and the revolving speed Ne), the electrical energy regenerated or consumed by the clutch motor 30, and the electrical energy consumed or regenerated by the assist motor 40. The output energy from the engine 50 can thus be transmitted as the power to the drive shaft 22 with a higher efficiency.

Figure 5:
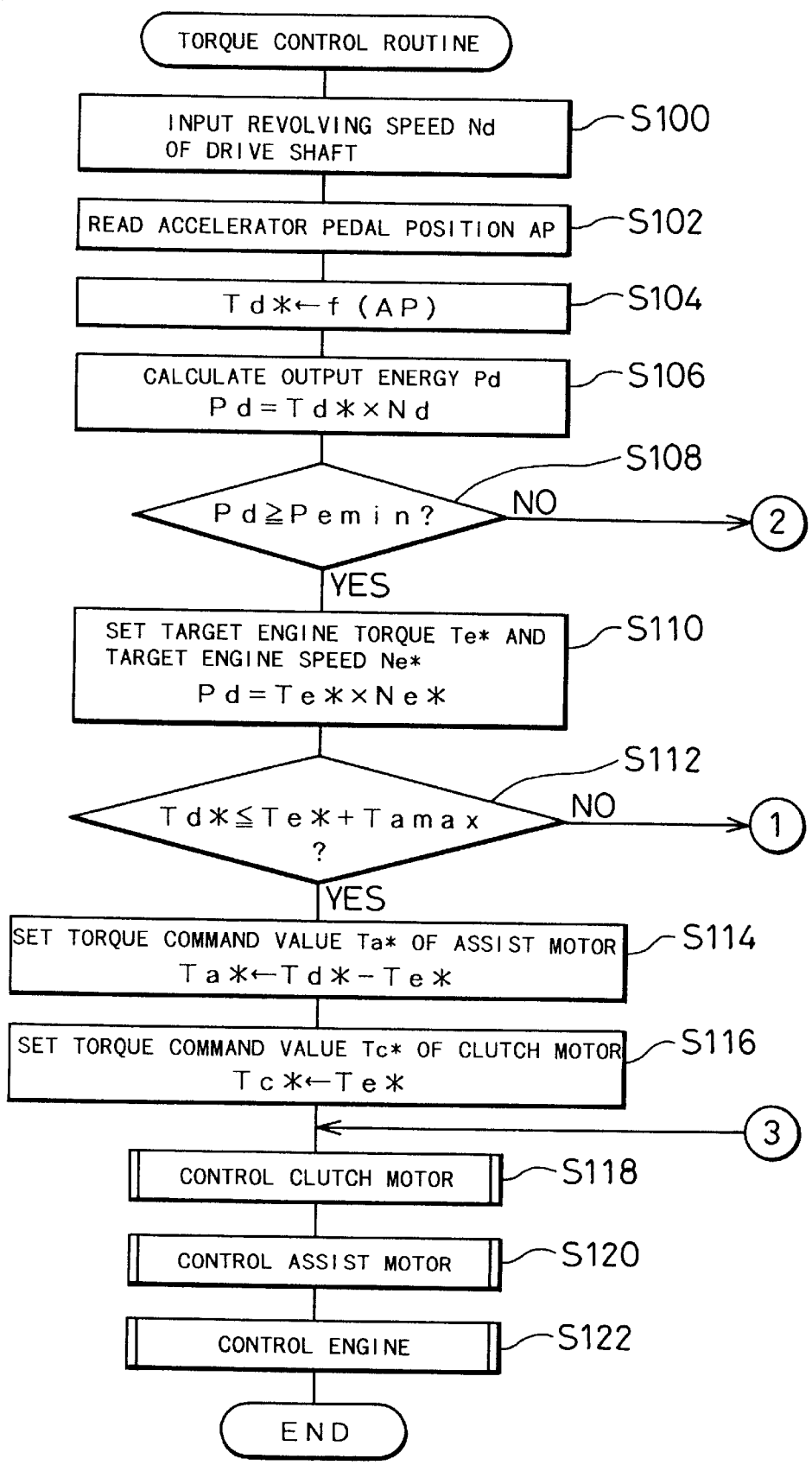
FIGS. 5 through 7 are flowcharts showing a torque control routine executed by the control CPU 90 of the controller 80.
Figure 6:
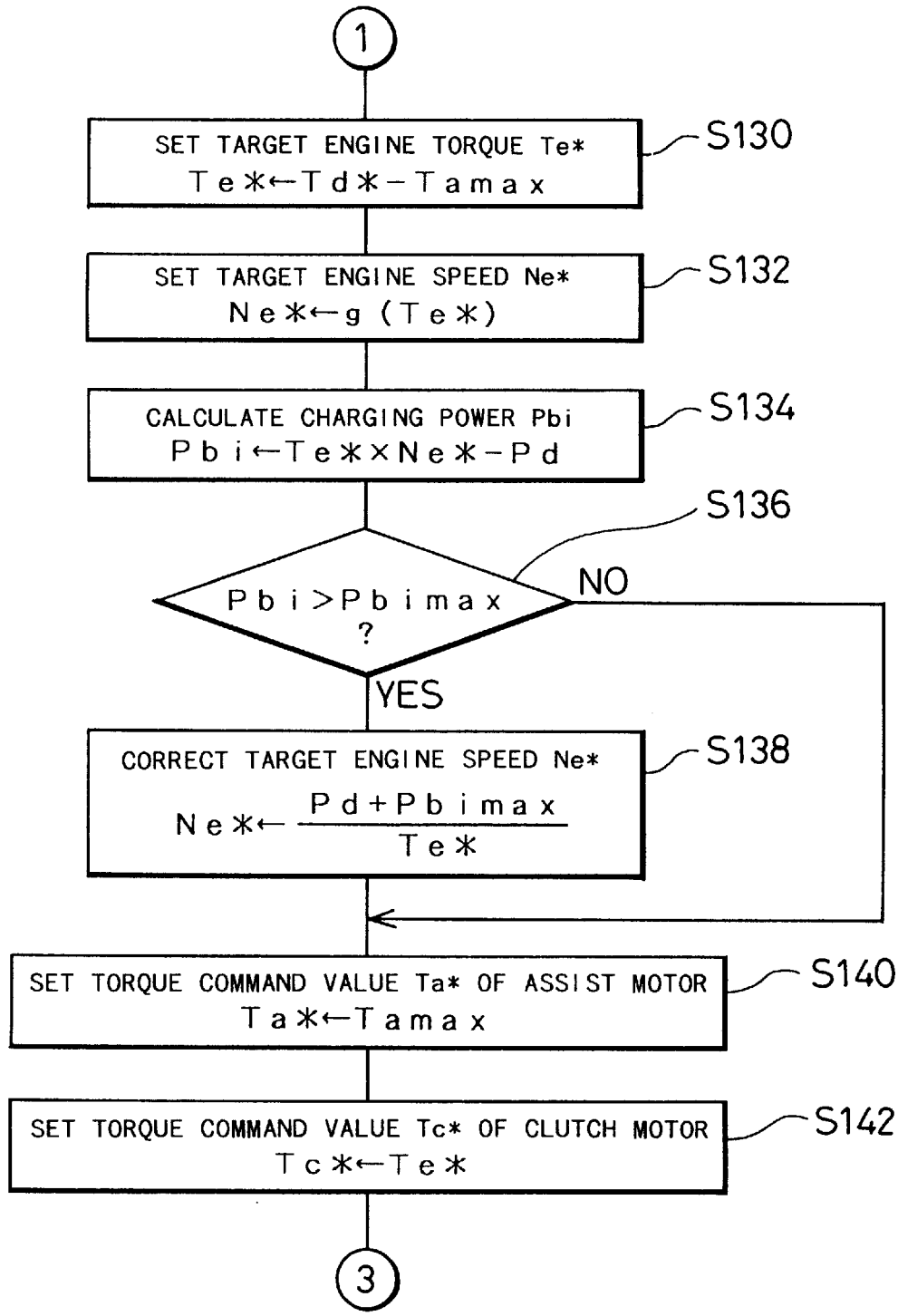
Figure 7:
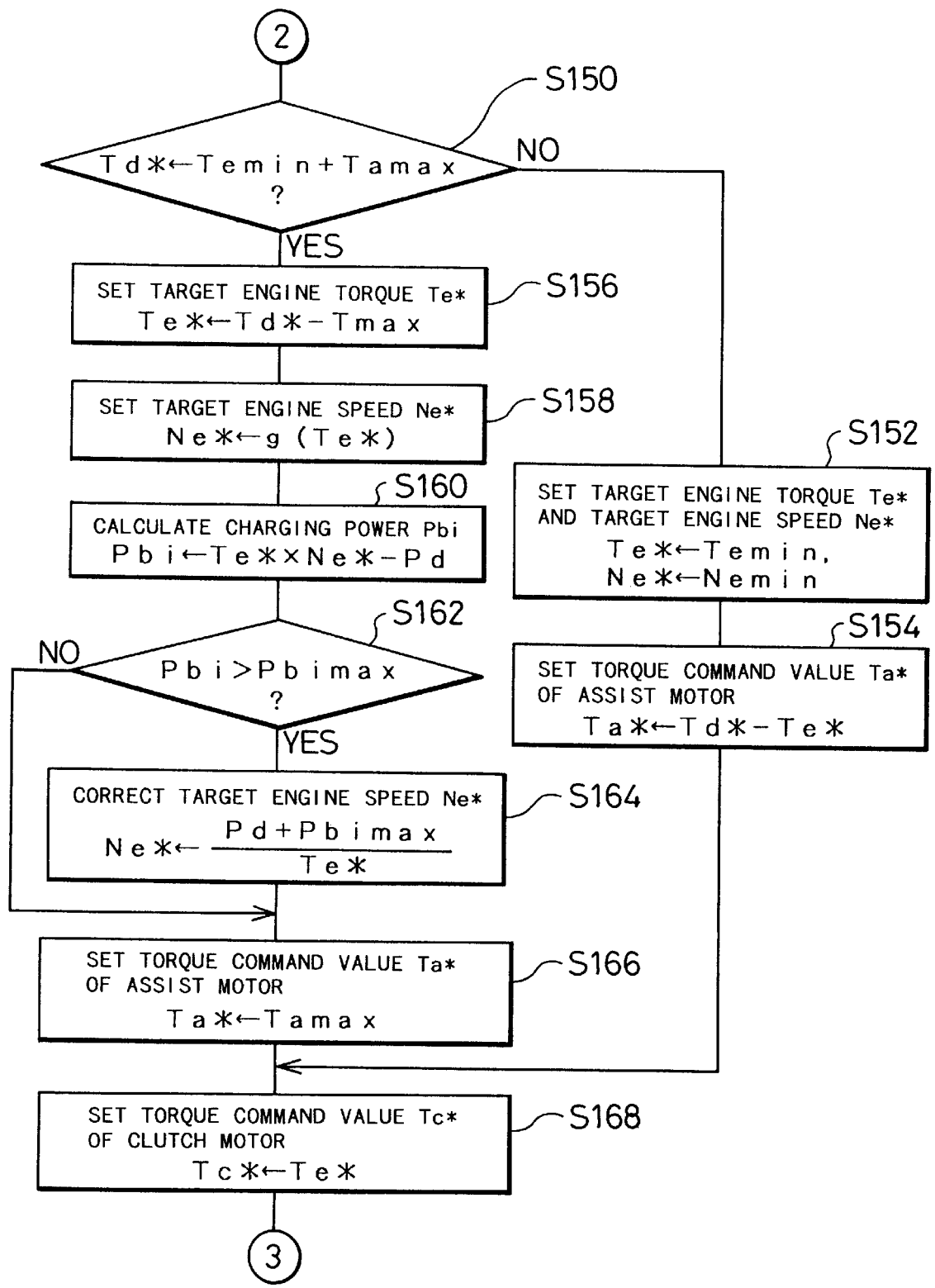

The following describes a typical procedure of such torque conversion carried out according to a torque control routine shown in the flowcharts of FIGS. 5 through 7. When the program enters the torque control routine of FIG. 5, the control CPU 90 of the controller 80 first receives data of revolving speed Nd of the drive shaft 22 at step S100. The revolving speed Nd of the drive shaft 22 can be computed from the rotational angle θd of the drive shaft 22 read from the resolver 48. At subsequent step S102, the control CPU 90 reads the accelerator pedal position AP detected with the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S104 at which the control CPU 90 obtains an output torque command value Td* corresponding to the input accelerator pedal position AP. In this embodiment, output torque command values Td* corresponding to the respective accelerator pedal positions AP have been set in advance. In response to an input of the accelerator pedal position AP, the control CPU 90 reads out the output torque command value Td* corresponding to the input accelerator pedal position AP.

At step S106, an amount of energy Pd to be output to the drive shaft 22 is calculated from the output torque command value Td* obtained at step S104 and the input revolving speed Nd of the drive shaft 22 according to the equation of Pd=Td*×Nd. The program then proceeds to step S108, at which it is determined whether or not the output energy Pd is equal to or greater than a minimum output energy Pemin. The minimum output energy Pemin is set as a minimum value that can be stably output from the engine 50 with a sufficient efficiency. When the output energy Pd is determined to be not less than the minimum output energy Pemin, the program carries out the processing of steps S110 through S142 shown in the flowcharts of FIGS. 5 and 6. When the output energy Pd is determined to be less than the minimum output energy Pemin, on the other hand, the program carries out the processing of steps S150 through S168 shown in the flowchart of FIG. 7. The output energy Pd is equal to or greater than the minimum output energy Pemin under the normal conditions. The following thus describes first the processing under the condition that Pd is not less than Pemin and then the processing under the condition that Pd is less than Pemin.

When the output energy Pd is determined to be equal to or greater than the minimum output energy Pemin at step S108, the program goes to step S110, at which the control CPU 90 sets a target torque Te* and a target revolving speed Ne* of the engine 50. It is here assumed that all the required energy Pd to be output to the drive shaft 22 is supplied from the engine 50. On this assumption, since the energy supplied from the engine 50 is equal to the product of the torque Te and the revolving speed Ne of the engine 50, the relationship between the output energy Pd, the target engine torque Te*, and the target engine speed Ne* can be expressed as Pd=Te*×Ne*. There are, however, numerous combinations of the target engine torque Te* and the target engine speed Ne* satisfying the above relationship. In this embodiment, a favorable combination of the target torque Te* and the target revolving speed Ne* of the engine 50 is set in the following manner, in order to enable the engine 50 to be driven at a driving point of highest possible efficiency.

Figure 8:
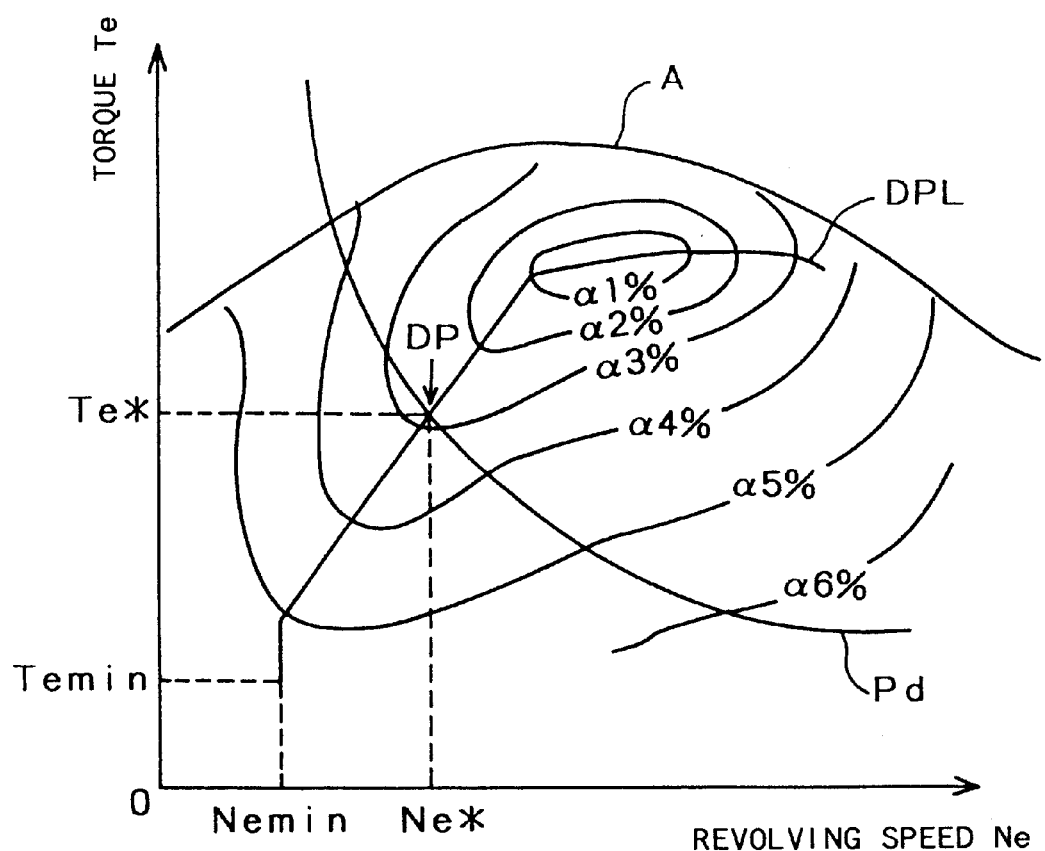
FIG. 8 shows an exemplified relationship between the output energy Pd, the target engine torque Te*, and the target engine speed Ne*.

FIG. 8 shows an exemplified relationship between the output energy Pd, the target engine torque Te*, and the target engine speed Ne*, which allows the engine 50 to be driven at driving points of highest possible efficiency. The curve A in FIG. 8 represents a boundary of an engine-operable range, in which the engine 50 can be driven, and the curve DPL represents driving points of the engine 50 with the highest possible efficiency. In the engine-operable range, efficiency curves, such as curves α1 through α6, can be drawn by successively joining the driving points having the identical efficiency. The curve DPL is obtained by joining the ridges of these efficiency curves with one another. The energy Pd to be output from the engine 50 is defined as the product of the engine torque Te and the engine speed Ne, and can thus be given as the curve Pd of constant output energy in FIG. 8. With respect to a known output energy Pd, the target torque Te* and the target revolving speed Ne* of the engine 50 can be determined as a driving point at the intersection of the curve Pd of constant output energy and the curve DPL. In this embodiment, such a relationship between the output energy Pd, the target engine torque Te*, and the target engine speed Ne* is stored in advance as a map in the ROM 90b. The target engine torque Te* and the target engine speed Ne* corresponding to the calculated output energy Pd are then read from the map.

At subsequent step S112, the output torque command value Td* obtained at step S104 is compared with the sum of the target torque Te* of the engine 50 and a maximum torque Tamax that can be output from the assist motor 40. The sum of the target engine torque Te* and the maximum torque Tamax represents a maximum torque that can be output to the drive shaft 22 when the engine 50 is driven with the target torque Te*. This is ascribed to the following. The maximum torque that can be output to the drive shaft 22 is generally expressed as the sum of the torque Tc of the clutch motor 30 and the maximum torque Tamax. The torque Tc of the clutch motor 30 is, however, identical with the loading torque Te of the engine 50 and is set equal to the target engine torque Te* (Tc=Te*), in order to drive the engine 50 with the target engine torque Te*. The processing of step S112 accordingly determines whether or not the output torque Td* which the driver desires to be transmitted to the drive shaft 22 is within a possible output range from the engine 50 that is driven at a specific driving point set corresponding to the output torque Td* by the relationship of FIG. 8.

When the output torque command value Td* is equal to or smaller than the sum of the target engine torque Te* and the maximum torque Tamax at step S112, the program proceeds to step S114, at which the difference obtained by subtracting the target engine torque Te* from the output torque command value Td* is set as a torque command value Ta* of the assist motor 40, and then to step S116, at which the target torque Te* of the engine 50 is set as a torque command value Tc* of the clutch motor 30. The torque command value Tc* of the clutch motor 30 is set equal to the target torque Te* of the engine 50, because the torque TC of the clutch motor 30 is identical with the loading torque Te of the engine 50 as mentioned previously. The processing carried out when the output torque command value Td* is greater than the sum of the target engine torque Te* and the maximum torque Tamax at step S112 will be described later.

After setting the target torque Te* and the target revolving speed Ne* of the engine 50 and the torque command values Tc* and Ta* of the clutch motor 30 and the assist motor 40, the program proceeds to steps S118, S120, and S122 to control the clutch motor 30, the assist motor 40, and the engine 50. As a matter of convenience of illustration, the control operations of the clutch motor 30, the assist motor 40, and the engine 50 are shown as separate steps. In the actual procedure, however, these control operations are comprehensively carried out in parallel. By way of example, the control CPU 90 simultaneously controls the clutch motor 30 and the assist motor 40 by utilizing an interrupting process, while transmitting an instruction to the EFIECU 70 through communication in order to allow the EFIECU 70 to control the engine 50 concurrently.

Figure 9:
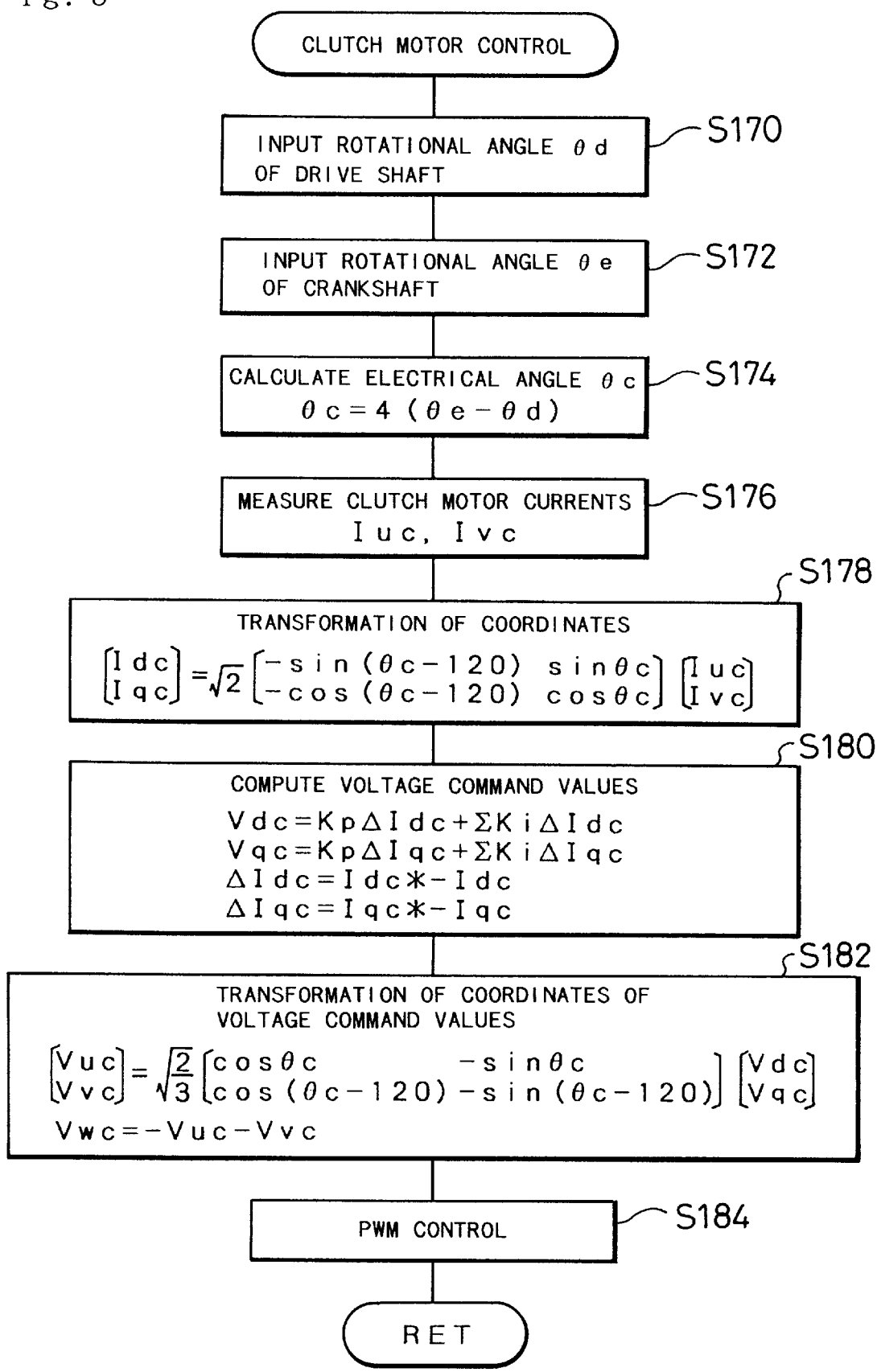
FIG. 9 is a flowchart showing a fundamental procedure of controlling the clutch motor 30 executed by the controller 80.

FIG. 9 is a flowchart showing details of the control process of the clutch motor 30 executed at step S118 in the flowchart of FIG. 5. When the program enters the clutch motor control routine, the control CPU 90 of the controller 80 first reads the rotational angle θd of the drive shaft 22 from the resolver 48 at step S170 and the rotational angle θe of the crankshaft 56 of the engine 50 from the resolver 39 at step S172. The control CPU 90 then calculates a electrical angle θc of he clutch motor 30 by the equation of θc=4(θe−θd) at step S174.

The program proceeds to step S176, at which the control CPU 90 reads the clutch motor currents Iuc and Ivc, which respectively flow through the U phase and V phase of the three-phase coils 36 in the clutch motor 30 and are measured with the ammeters 95 and 96. Although the currents naturally flow through all the three phases U, V, and W, measurement is required only for the currents passing through the two phases since the sum of the currents is equal to zero. At subsequent step S178, the control CPU 90 executes transformation of coordinates (three-phase to two-phase transformation) using the values of currents flowing through the three phases obtained at step S176. The transformation of coordinates maps the values of currents flowing through the three phases to the values of currents passing through d and q axes of the permanent magnet-type synchronous motor and is executed according to Equations (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and subsequently determines voltage command values Vdc and Vqc with respect to the d and q axes at step S180. In accordance with a concrete procedure, the control CPU 90 executes arithmetic operations of Equations (2) and Equations (3) given below:

$$\Delta Idc = Idc^* - Idc \quad \Delta Iqc = Iqc^* - Iqc \quad (2)$$

$$Vdc = Kp1 \cdot \Delta Idc + \Sigma Ki1 \cdot \Delta Idc \quad Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied. Each voltage command value Vdc (vqc) includes apart in proportion to the deviation ΔI from the current command value I* (the first term in the right side of Equation (3)) and a summation of historical data of the deviations ΔI for 'i' times (the second term in the right side). The control CPU 90 then re-transforms the coordinates of the voltage command values thus obtained (two-phase to three-phase transformation) at step S182. This corresponds to an inverse of the transformation executed at step S178. The inverse transformation determines voltages Vuc, Vvc, and Vwc actually applied to the three-phase coils 36 as expressed by Equations (4) given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \quad (4)$$

$$Vwc = -Vuc - Vvc$$

The actual voltage control is accomplished by on-off operation of the transistors Tr1 through Tr6 in the first driving circuit 91. At step S184, the on- and off-time of the transistors Tr1 through Tr6 in the first driving circuit 91 is PWM (pulse width modulation) controlled in order to attain the voltage command values Vuc, Vvc, and Vwc determined by Equations (4) above.

The torque command value Tc* is positive when a positive torque is applied to the drive shaft 22 in the direction of rotation of the crankshaft 56. By way of example, it is assumed that a positive value is set to the torque command value Tc*. When the revolving speed Ne of the engine 50 is greater than the revolving speed Nd of the drive shaft 22 on this assumption, that is, when the revolving speed difference Nc (=Ne−Nd) is positive, the clutch motor 30 is controlled to carry out the regenerative operation and produce a regenerative current according to the revolving speed difference Nc. When the revolving speed Ne of the engine 50 is lower than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the revolving magnetic field generated by the currents flowing through the three-phase coils 36 mounted on the inner rotor 34 of the clutch motor 30. The identical switching control is executed for both the regenerative operation and the power operation of the clutch motor 30 as long as the sign of the torque command value Tc* is not changed. The clutch motor control routine of FIG. 9 is thus applicable to both the regenerative operation and the power operation. Under the condition of braking the drive shaft 22 or moving the vehicle in reverse, the torque command value Tc* has the negative sign. The clutch motor control routine of FIG. 9 is also applicable to the control procedure under such conditions, when the relative angle θc obtained at step S174 is varied in the reverse direction.

Figure 10:
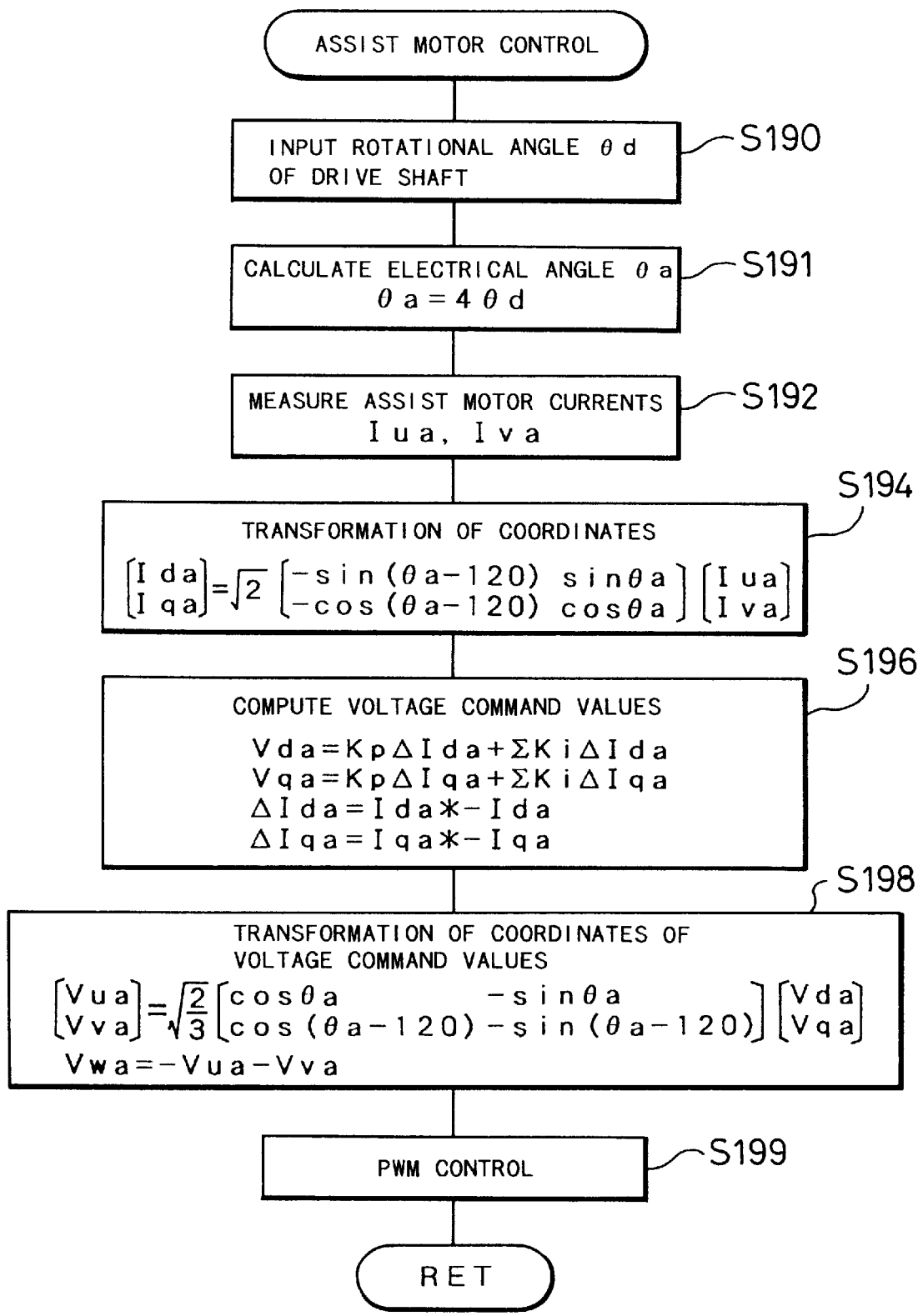
FIG. 10 is a flowchart showing a fundamental procedure of controlling the assist motor 40 executed by the controller 80.

FIG. 10 is a flowchart showing details of the torque control process of the assist motor 40 executed at step S120 in the flowchart of FIG. 5. When the program enters the assist motor control routine, the control CPU 90 of the controller 80 first reads the rotational angle θd of the drive shaft 22 from the resolver 48 at step S190, and calculates a electrical angle θa of the assist motor 40 by the equation of θa=4θd at step S191. The control CPU 90 then receives data of assist motor currents Iua and Iva at step S192, which respectively flow through the U phase and V phase of the three-phase coils 44 in the assist motor 40 and are measured with the ammeters 97 and 98. The control CPU 90 then executes transformation of coordinates for the currents of the three phases at step S194, computes voltage command values Vda and Vqa at step S196, and executes inverse transformation of coordinates for the voltage command values at step S198. At subsequent step S199, the control CPU 90 determines the on- and off-time of the transistors Tr11 through Tr16 in the second driving circuit 92 for PWM (pulse width modulation) control. The processing executed at steps S194 through S199 is similar to that executed at steps S178 through S184 of the clutch motor control routine shown in the flowchart of FIG. 9.

The torque command value Ta* of the assist motor 40 is determined by subtracting the target torque Te* of the engine 50 from the output torque command value Td* at step S114 in the flowchart of FIG. 5. It is here assumed that the drive shaft 22 is rotated in the direction of rotation of the crankshaft 56 and that the torque command value Ta* of the assist motor 40 is positive when a positive torque is applied to the drive shaft 22 in the direction of rotation of the crankshaft 56. In case that the output torque command value Td* is greater than the target engine torque Te*, a positive value is set to the torque command value Ta*, so that the assist motor 40 carries out the power operation to accelerate the rotation of the drive shaft 22. In case that the output torque command value Td* is smaller than the target engine torque Te*, on the contrary, a negative value is set to the torque command value Ta*, so that the assist motor 40 carries out the regenerative operation to depress the rotation of the drive shaft 22. Like the control of the clutch motor 30, the assist motor control routine of FIG. 10 is thus applicable to both the power operation and the regenerative operation of the assist motor 40. This is also true when the drive shaft 22 is rotated in reverse of the rotation of the crankshaft 56.

The control of the engine 50 (step S122 in the flowchart of FIG. 5) is executed in the following manner. In order to enable the engine 50 to be stationarily driven at a driving point defined by the target engine torque Te* and the target engine speed Ne* set at step S110 in FIG. 5, the control CPU 90 regulates the torque Te and the revolving speed Ne of the engine 50. In accordance with a concrete procedure, the control CPU 90 transmits an instruction to the EFIECU 70 through communication, and the EFIECU 70 increases or decreases the amount of fuel injection from the fuel injection valve 51 or the position of the throttle valve 66, so as to make the output torque and the revolving speed of the engine 50 gradually approach the target engine torque Te* and the target engine speed Ne*. The torque Te of the engine 50 depends upon the loading torque Tc of the clutch motor 30, which is set equal to the torque command value Tc* by the control of the clutch motor 30 carried out at step S118 in the flowchart of FIG. 5. This means the torque command value Tc* of the clutch motor 30 is equal to the target engine torque Te*. The control procedure of the engine 50 accordingly makes the revolving speed of the engine 50 approach the target engine speed Ne*.

For the clarity of explanation, the processing of steps S110 through S122 in the torque control routine of FIG. 5 is carried out on the assumption of an ideal state where both the clutch motor 30 and the assist motor 40 have efficiencies of 100%. In case that the efficiencies of the clutch motor 30 and the assist motor 40 are 100%, this processing enables the power output from the engine 50 to be converted to a required torque and transmitted to the drive shaft 22 by means of the clutch motor 30 and the assist motor 40 as described previously with the drawing of FIG. 4. In the actual state, however, the clutch motor 30 and the assist motor 40 have efficiencies of less than 100%. The processing of steps S110 through S122 carried out in the power output apparatus with the real motors thus results in decreasing the power output to the drive shaft 22 corresponding to the lowered efficiencies of the motors, or alternatively discharging the battery 94 to supplement the insufficient energy. In order to avoid decreasing the power output to the drive shaft 22 or discharging the battery 94, the target torque Te* and the target revolving speed Ne* of the engine 50 set at step S110 in the flowchart of FIG. 5 should be calculated not from the output energy Pd but from a value obtained by dividing the output energy Pd by a transmission efficiency Kt. The transmission efficiency Kt represents an efficiency at which the clutch motor 30 and the assist motor 40 transmit the power output from the engine 50 to the drive shaft 22. Namely the following relationship defined by Equation (5) is used for the calculation. All the description hereinafter is also on the assumption of an ideal state where the transmission efficiency is 100%, so that the real state in the actual power output apparatus is obtained by multiplying the actual transmission efficiency Kt.

$$Pd/Kt = Te^* \times Ne^* \tag{5}$$

Referring back to the torque control routine shown in the flowchart of FIG. 5, when the output torque command value Td* is greater than the sum of the target engine torque Te* and the maximum torque Tamax at step S112, the program carries out the processing shown in the flowchart of FIG. 6. The flowchart of FIG. 6 shows the processing carried out when the output torque Td* which the driver desires to be transmitted to the drive shaft 22 is out of the possible output range from the engine 50 that is driven at a specific driving point set corresponding to the output torque Td by the relationship of FIG. 8. In this case, the control CPU 90 of the controller 80 first subtracts the maximum torque Tamax of the assist motor 40 from the output torque command value Td* and sets the difference as a new target torque Te* of the engine 50 at step S130. The target revolving speed Ne* of the engine 50 corresponding to the newly set target engine torque Te* is then read from the map of FIG. 8 showing the relationship between the output energy Pd, the target engine torque Te*, and the target engine speed Ne* at step S132.

Figure 11:
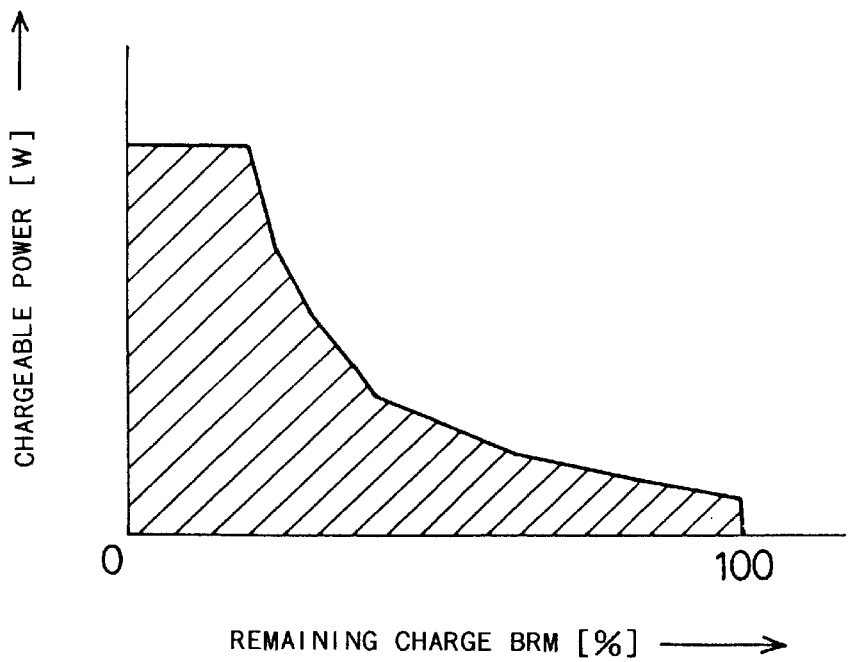
FIG. 11 is a graph showing the chargeable electric power plotted against the remaining charge BRM of the battery 94.

The target engine torque Te* and the target engine speed Ne* newly set at steps S130 and S132 are both greater than those set at step S110. In case that the engine 50 is driven at the target engine speed Ne* and with the target engine torque Te*, the energy Pe output from the engine 50 can thus be made greater than the output energy Pd which the driver desires. In order to allow the battery 94 to be charged with this excess energy, at subsequent step S134, the CPU 90 subtracts the output energy Pd required to be output to the drive shaft 22 from the energy Pe output from the engine 50 (Pe=Te*×Ne*) to determine a charging power Pbi for charging the battery 94. The charging power Pbi is then compared with a maximum chargeable power Pbimax at step S136. The maximum chargeable power Pbimax is determined depending upon the properties of the battery 94 and its remaining charge BRM. By way of example, the relationship between the remaining charge BRM and the chargeable power of the battery 94 is set in advance as a map as illustrated in FIG. 11, and the maximum chargeable power Pbimax corresponding to the remaining charge BRM of the battery 94 is read from the preset map.

When the charging power Pbi is greater than the maximum chargeable power Pbimax at step S136, the control CPU 90 recalculates the target engine speed Ne* according to Equation (6) given below, in order to decrease the energy Pe output from the engine Pe and protect the battery 94 from damages at step S138. Equation (6) gives the new target engine speed Ne* that allows the charging power Pbi obtained by subtracting the output energy Pd required to be output to the drive shaft 22 from the energy Pe output from the engine 50 (=Te*×Ne*) to coincide with the maximum chargeable power Pbimax.

$$Ne^* = \frac{Pd + Pbimax}{Te^*} \quad (6)$$

The control CPU 90 subsequently sets the torque command value Ta* of the assist motor 40 equal to the maximum torque Tamax at step S140, and sets the torque command value Tc* of the clutch motor 30 equal to the target torque Te* of the engine 50 at step S142. After setting the target values and the torque command values, the program returns to the processing of steps S118 through S122 in the flowchart of FIG. 5 to control the clutch motor 30, the assist motor 40, and the engine 50.

Figure 12:
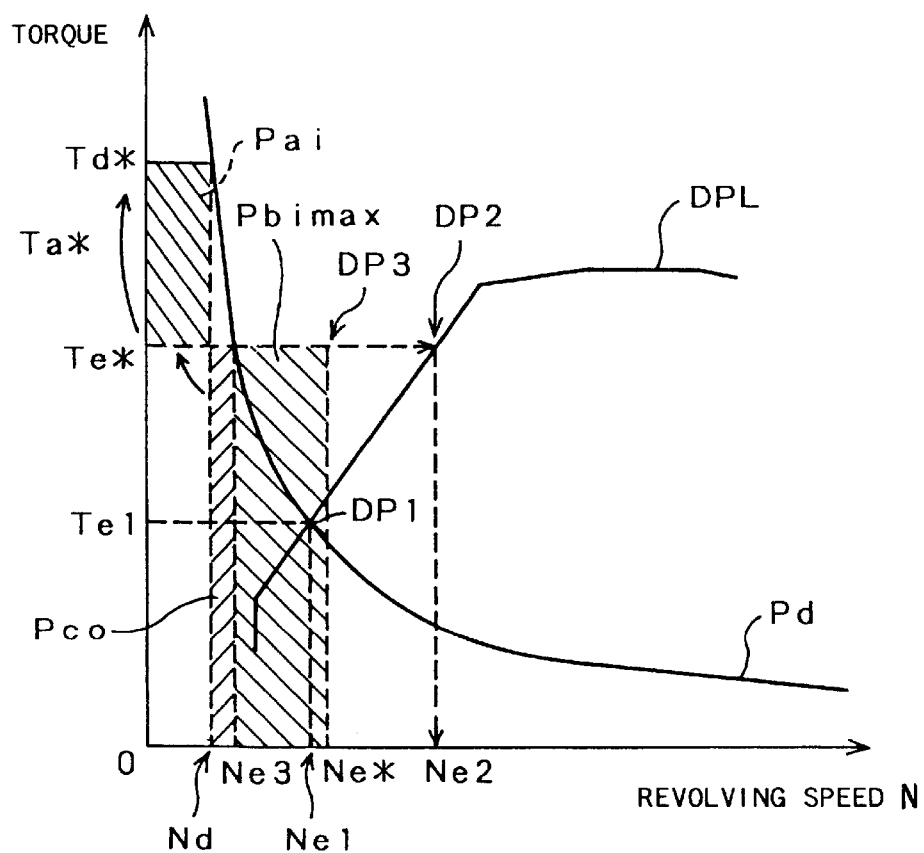
FIG. 12 shows the state of energy at the respective driving points of the engine 50.

The state of energy conversion after the processing of FIG. 6 is described in a greater detail. FIG. 12 shows the state of energy at the respective driving points of the engine 50 after the processing of FIG. 6. It is here assumed that the driver steps on the accelerator pedal 64 to a significant degree during the low-speed driving of the vehicle, so as to set a large output torque command value Td*. The drive shaft 22 is rotated at a low revolving speed Nd under such conditions, so that the output energy Pd calculated by multiplying the revolving speed Nd by the output torque command value Td* takes a small value. The specific driving point of the engine 50 for generating this output energy Pd is given as a driving point DP1 in FIG. 12 that is defined by a torque Te1 and a revolving speed Ne2 and expressed as the intersection of the curve Pd of constant output energy and the curve DPL representing the driving points of the engine 50 with the highest possible efficiency. The driving point DP1 is defined by the target engine torque Te* and the target engine speed Ne* set at step S110 in the flowchart of FIG. 5.

Since the output torque command value Td* is greater than the sum of the torque Te1 and the maximum torque Tamax, the target engine torque Te* is determined by subtracting the maximum torque Tamax from the output torque command value Td* at step S130 in the flowchart of FIG. 6. The specific driving point of the engine 50 corresponding to the target engine torque Te* is given as a driving point DP2 in FIG. 12 that is defined by the target engine torque Te* and the revolving speed Ne2. In this case, the energy Pe output from the engine 50 is expressed as the product of the target torque Te* and the revolving speed Ne2 and becomes greater than the output energy Pd required to be output to the drive shaft 22. This energy difference is obtained as the charging power Pbi and absorbed by the battery 94. In case that the charging power Pbi is greater than the maximum chargeable power Pbimax, the target revolving speed Ne* of the engine 50 is changed to make the charging power Pbi equal to the maximum chargeable power Pbimax at step S138, so as to enable the engine 50 to be driven at a driving point DP3.

When the engine 50 is driven at the driving point DP3, the clutch motor 30 regenerates energy or electric power expressed as the sum of areas Pbimax and Pco corresponding to the difference Nc between the revolving speed Nd of the drive shaft 22 and the revolving speed Ne of the engine 50. Among the regenerated electric power, the electric power corresponding to the area Pco is given to the assist motor 40 as the electric power corresponding to an area Pai, whereas the electric power corresponding to the area Pbimax is used as the charging power Pbi for charging the battery 94. In case that the energy Pe output from the engine 50 is identical with the output energy Pd and that the target torque Te* of the engine 50 is determined by subtracting the maximum torque Tamax from the output torque command value Td*, the engine 50 is driven at a revolving speed Ne3.

Referring back to the flowchart of FIG. 5, when the output energy Pd is less than the minimum output energy Pemin at step S108, the program carries out the processing shown in the flowchart of FIG. 7. This state is observed when the vehicle starts on an upward slope or is running on a steep upward slope. In this case, the control CPU 90 of the controller 80 first compares the output torque command value Td* obtained at step S104 in the flowchart of FIG. 5 with the sum of a minimum torque Temin of the engine 50 and the maximum torque Tamax of the assist motor 40 at step S150. The minimum torque Temin of the engine 50 represents a torque at a specific driving point that gives a minimum output energy from the engine 50 as shown in FIG. 8.

When the output torque command value Td* is equal to or greater than the sum of the minimum torque Temin of the engine 50 and the maximum torque Tamax of the assist motor 40, the program carries out the processing of steps S156 through S168, which are identical with that of steps S130 through S142 in the flowchart of FIG. 6. After setting the target values and torque command values, the program returns to the processing of steps S118 through S122 in the flowchart of FIG. 5 to control the clutch motor 30, the assist motor 40, and the engine 50. When the output torque command value Td* is smaller than the sum of the minimum torque Temin of the engine 50 and the maximum torque Tamax of the assist motor 40, on the other hand, the program proceeds to step S152, at which the minimum torque Temin and a minimum revolving speed Nemin at a specific driving point that gives a minimum output torque from the engine 50 are set as the target torque Te* and the target revolving speed Ne* of the engine 50. The control CPU 90 subsequently sets the torque command value Ta* of the assist motor 40 equal to the difference between the output torque command value Td* and the target engine torque Te* at step S154, and sets the torque command value Tc* of the clutch motor 30 equal to the target engine torque Te* at step S168. After setting the target values and torque command values, the program returns to the processing of steps S118 through S122 in the flowchart of FIG. 5 to control the clutch motor 30, the assist motor 40, and the engine 50.

As discussed above, the power output apparatus 20 of the first embodiment enables the power output from the engine 50 to be converted to a required torque and output to the drive shaft 22 by means of the clutch motor 30 and the assist motor 40. The structure of the first embodiment allows the engine to be driven at driving points with high efficiency, thereby improving the efficiency of the whole power output apparatus 20.

In case that the required torque Td* to the drive shaft 22 is significantly large and can thus not be output from the engine 50, the clutch motor 30, or the assist motor 40 under the condition that the energy Pe output from the engine 50 is identical with the output energy Pd required to be output to the drive shaft 22, the energy Pe output from the engine 50 is set to be greater than the output energy Pd required to be output to the drive shaft 22. This enables the required torque Td* to be output from the engine 50, the clutch motor 30, and the assist motor 40. The excess energy generated at this moment is stored temporarily in the battery 94 and later utilized by the clutch motor 30 or the assist motor 40. This structure further improves the energy efficiency of the whole power output apparatus 20. As mentioned above, the energy Pe output from the engine 50 is made greater than the output energy Pd required to be output to the drive shaft 22, in order to enable the engine 50, the clutch motor 30, and the assist motor 40 to output the required torque Td* to the drive shaft 22. When this causes the excess energy to exceed the maximum chargeable power Pbimax of the battery 94, the driving point of the engine 50 is changed by lowering the revolving speed Ne of the engine 50 while keeping the torque Te unchanged. This procedure decreases the energy Pe output from the engine 50 and effectively prevents the battery 94 from being damaged by charging with the excessively large electric power.

In the power output apparatus 20 of the first embodiment, the driving point of the engine 50 is determined according to the efficiency of the engine 50. In accordance with another possible application, however, the driving point of the engine 50 may be determined according to the comprehensive efficiency that takes into account the efficiency of the engine 50, the efficiencies of the clutch motor 30 and the assist motor 40, and the charge-discharge efficiency of the battery 94.

In the power output apparatus 20 of the first embodiment, the charging power Pbi is compared with the maximum chargeable power Pbimax and is set to be equal to or less than the maximum chargeable power Pbimax. In accordance with another possible structure, however, the charging power Pbi is compared with a predetermined value that is equal to or less than the maximum chargeable power Pbimax and is set to be not greater than the predetermined value.

In the power output apparatus 20 of the first embodiment, the energy Pe output from the engine 50 is made greater than the output energy Pd required to be output to the drive shaft 22, in order to enable the engine 50, the clutch motor 30, and the assist motor 40 to output the required torque Td* to the drive shaft 22. When this causes the excess energy to exceed the maximum chargeable power Pbimax of the battery 94, the driving point of the engine 50 is changed to decrease the energy Pe output from the engine 50 by lowering the revolving speed Ne of the engine 50 while keeping the torque Te unchanged. The driving point of the engine 50 may, however, be changed by lowering both the revolving speed Ne and the torque Te of the engine 50 according to the requirements.

Figure 13:
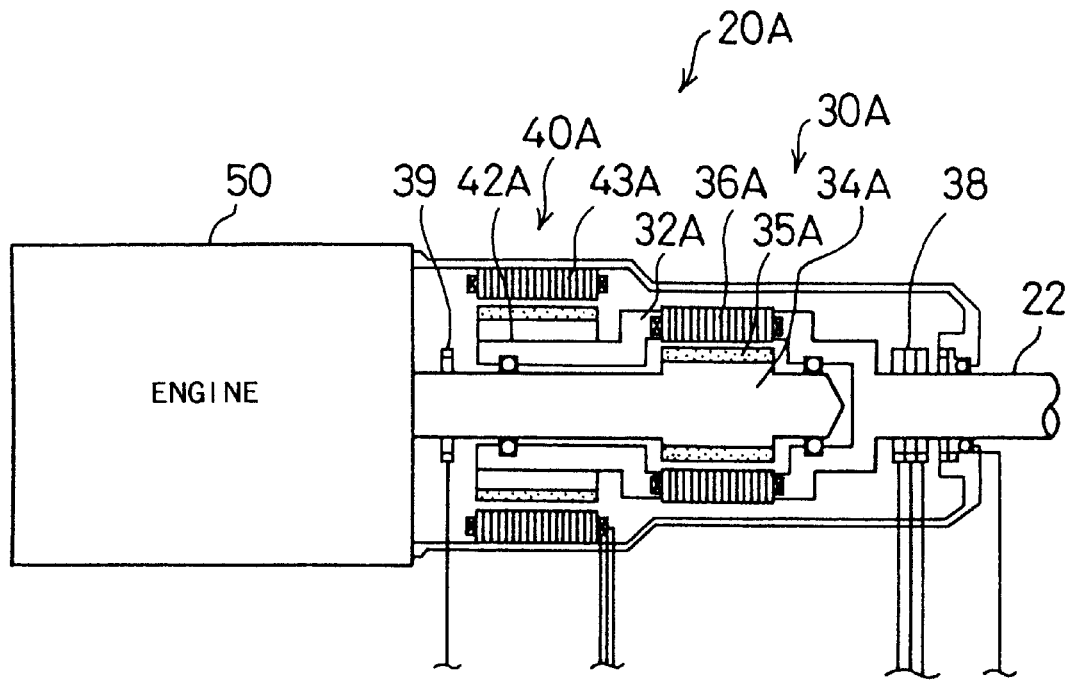
FIG. 13 schematically shows structure of another power output apparatus 20A as a modification of the power output apparatus 20 of the first embodiment.
Figure 14:
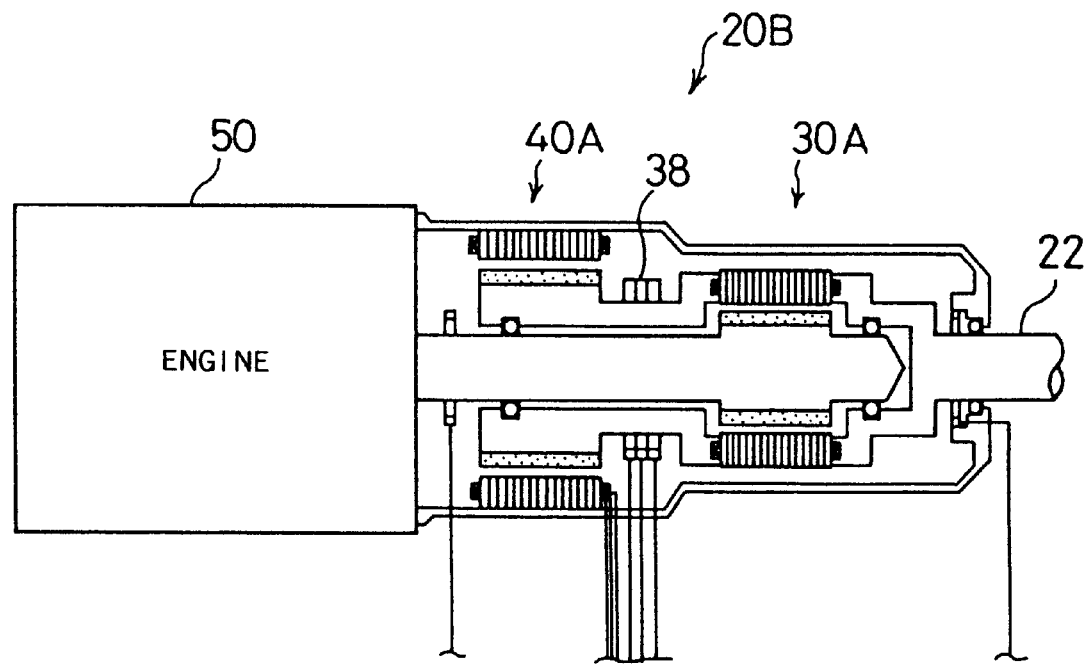
FIG. 14 schematically shows structure of still another power output apparatus 20B as another modification of the power output apparatus 20 of the first embodiment.

Although the assist motor 40 is directly attached to the drive shaft 22 in the power output apparatus 20 of the first embodiment, the assist motor 40 may be attached to a shaft which is separate from the drive shaft 22 but linked with the drive shaft 22 via a gear. In this latter structure, the properties of the assist motor 40 can be varied by selecting the gear ratio. Like power output apparatuses 20A and 20B of modified structures shown in FIGS. 13 and 14, an assist motor 40A may be interposed between the engine 50 and a clutch motor 30A, wherein a rotor 42A of the assist motor 40A is connected to an outer rotor 32A of the clutch motor 30A, which is further linked with the drive shaft 22. Unlike the clutch motor 30 of the power output apparatus 20 of the first embodiment, in such modified structures, the crankshaft 56 of the engine 50 is connected to an inner rotor 34A of the clutch motor 30A, whereas the drive shaft 22 is linked with the outer rotor 32A. Three-phase coils 36A are accordingly mounted on the outer rotor 32A, and permanent magnets 35A on the inner rotor 34A. The rotary transformer 38 maybe attached to the drive shaft 22 as shown in the power output apparatus 20A of FIG. 13, or alternatively be attached to a position between the clutch motor 30A and the assist motor 40A as shown in the power output apparatus 20B of FIG. 14. The position of the rotary transformer 38 can be selected adequately according to the space of the vehicle with the power output apparatus mounted thereon.

Figure 15:
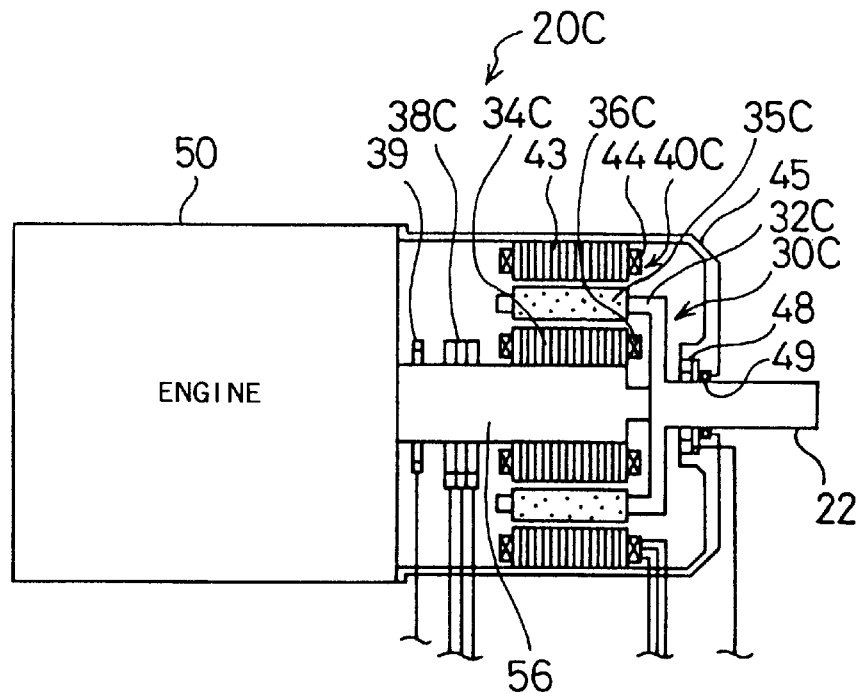
FIG. 15 schematically shows structure of another power output apparatus 20C as still another modification of the power output apparatus 20 of the first embodiment.

In the power output apparatus 20 of the first embodiment discussed above, the clutch motor 30 and the assist motor 40 are separately attached to the different positions of the drive shaft 22. Like a power output apparatus 20C illustrated in FIG. 15 as a modification of the power output apparatus 20, however, the clutch motor and the assist motor may be joined integrally with each other. A clutch motor 30C of the power output apparatus 20C includes an inner rotor 34C connecting with the crankshaft 56 and an outer rotor 32C linked with the drive shaft 22. Three-phase coils 36C are attached to the inner rotor 34C, and permanent magnets 35C are set on the outer rotor 32C in such a manner that the outer surface and the inner surface thereof have different magnetic poles. An assist motor 40C includes the outer rotor 32C of the clutch motor 30C and a stator 43 with three-phase coils 44 mounted thereon. In this structure, the outer rotor 32C of the clutch motor 30C also works as the rotor of the assist motor 40C. Since the three-phase coils 36C are mounted on the inner rotor 34C linked with the crankshaft 56, the rotary transformer 38 for supplying electric power to the three-phase coils 36C of the clutch motor 30C is attached to the crankshaft 56.

In the power output apparatus 20C, the voltage applied to the three-phase coils 36C on the inner rotor 34C is controlled against the inner-surface magnetic pole of the permanent magnets 35C set on the outer rotor 32C. This enables the clutch motor 30C to work in the same manner as the clutch motor 30 of the power output apparatus 20 of the first embodiment having the clutch motor 30 and the assist motor 40 separately attached to the drive shaft 22. The voltage applied to the three-phase coils 44 on the stator 43 is controlled against the outer-surface magnetic pole of the permanent magnets 35C set on the outer rotor 32C. This enables the assist motor 40C to work in the same manner as the assist motor 40 of the power output apparatus 20. All the operations of the power output apparatus 20 discussed above, that is, the torque control operations shown in the flowcharts of FIGS. 5 through 7, are thus also applicable to the power output apparatus 20C of modified structure.

The outer rotor 32C functions concurrently as one of the rotors in the clutch motor 30C and as the rotor of the assist motor 40C, thereby effectively reducing the size and weight of the power output apparatus 20C.

Figure 16:
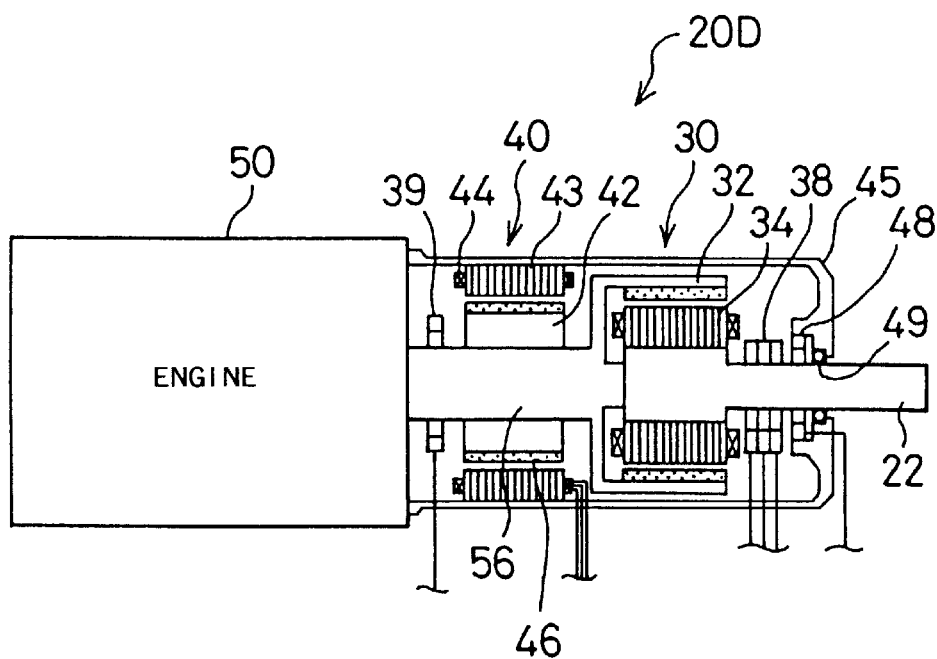
FIG. 16 schematically shows structure of another power output apparatus 20D as another modification of the power output apparatus 20 of the first embodiment.

Although the assist motor 40 is attached to the drive shaft 22 in the power output apparatus 20 of the first embodiment, the assist motor 40 may be attached to the crankshaft 56 of the engine 50 as illustrated in another power output apparatus 20D of FIG. 16 given as a further modification. The following describes the operation of torque conversion executed in this power output apparatus 20D.

By way of example, it is assumed that the engine 50 of the power output apparatus 20D is driven at a specific driving point, where the torque Te is equal to a value T1 and the revolving speed Ne is equal to a value N1, on the constant-output energy curve of FIG. 4 defined by the torque and the revolving speed, and that the revolving speed Nd of the drive shaft 22 is equal to a value N2. When the assist motor 40 attached to the crankshaft 56 applies a torque Ta (Ta=T2−T1) to the crankshaft 56, energy expressed as the sum of areas G2 and G3 in FIG. 4 is given to the crankshaft 56, so that the torque on the crankshaft 56 becomes equal to a value T2 (=T1+Ta). When the torque Tc of the clutch motor 30 is controlled to have the value T2, the torque Tc (=T1+Ta) is transmitted to the drive shaft 22, while electric power based on the difference Nc between the revolving speed Ne of the engine 50 and the revolving speed Nd of the drive shaft Nd (that is, energy expressed as the sum of areas G1 and G3) is regenerated by the clutch motor 30. The torque Ta of the assist motor 40 is then set to be just compensated by the electric power regenerated by the clutch motor 30, and the regenerative power is supplied to the second driving circuit 92 via the power lines L1 and L2, so that the assist motor 40 is driven with the regenerative power.

In accordance with another example, it is assumed that the engine 50 is driven at another driving point of FIG. 4, where the torque Te is equal to a value T2 and the revolving speed Ne is equal to a value N2, and that the revolving speed Nd of the drive shaft 22 is equal to the value N1. When the torque Ta of the assist motor 40 is controlled to have the value (T2−T1), the assist motor 40 carries out the regenerative operation and regenerates energy (electric power) expressed as the area G2 in FIG. 4 from the crankshaft 56. In the clutch motor 30, on the other hand, the inner rotor 34 rotates relative to the outer rotor 32 in the direction of rotation of the drive shaft 22 at a revolving speed corresponding to the revolving speed difference Nc (=N1−N2). The clutch motor 30 accordingly functions as a normal motor and gives energy expressed as the area G1 and corresponding to the revolving speed difference Nc to the drive shaft 22 as the energy of rotational motion. The torque Ta of the assist motor 40 is then set to enable the electric power consumed by the clutch motor 30 to be just compensated by the electric power regenerated by the assist motor 40, so that the clutch motor 30 is driven with the electric power regenerated by the assist motor 40.

Like the power output apparatus 20 of the first embodiment, in the power output apparatus 20D of the modified structure, the torque Ta of the assist motor 40 and the torque Tc of the clutch motor 30 are controlled to hold Equations (7) and (8) given below. This enables the energy output from the engine 50 to be subjected to free torque conversion and given to the drive shaft 22. The relationships of Equations (7) and (8) represent an ideal state where both the clutch motor 30 and the assist motor 40 have efficiencies of 100%. In the actual state, Tc×Nd and Ta become a little smaller.

$$Te \times Ne = Tc \times Nd \quad (7)$$

$$Te + Ta = Tc = Td \quad (8)$$

When the torque control routine of FIGS. 5 through 7 is applied to the power output apparatus 20D of the modified structure where the assist motor 40 is attached to the crankshaft 56 of the engine 50, the torque command value Tc* of the clutch motor 30 is set equal to the output torque command value Td* instead of the target engine torque Te* at steps S116, S142, and S168.

Figure 17:
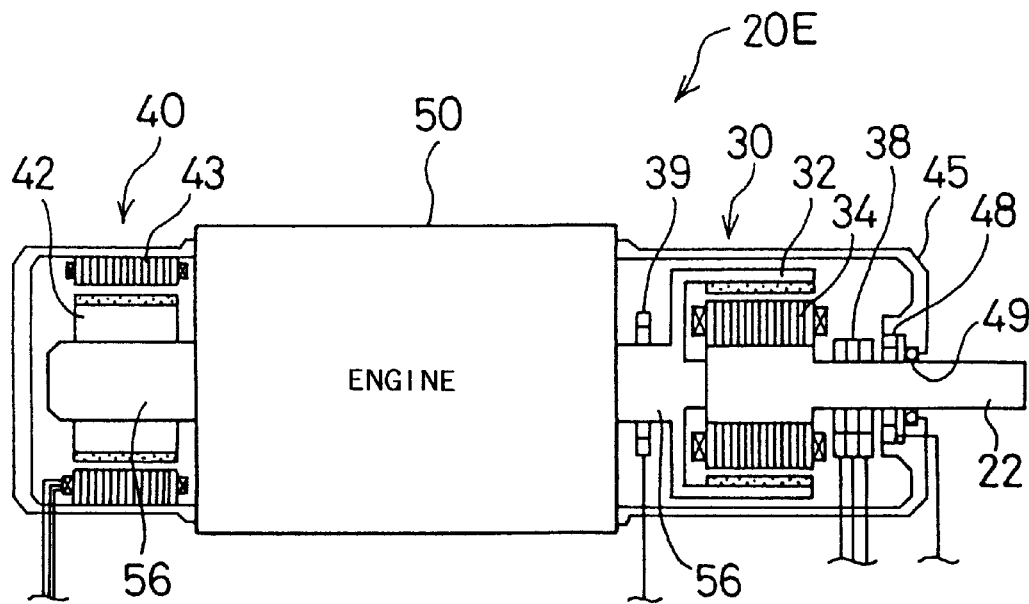
FIG. 17 schematically shows structure of still another power output apparatus 20E as another modification of the power output apparatus 20 of the first embodiment.

This structure having the assist motor 40 attached to the crankshaft 56 of the engine 50 is also realized in still another power output apparatus 20E illustrated in FIG. 17. In this power output apparatus 20E, the engine 50 is interposed between the clutch motor 30 and the assist motor 40.

Figure 18:
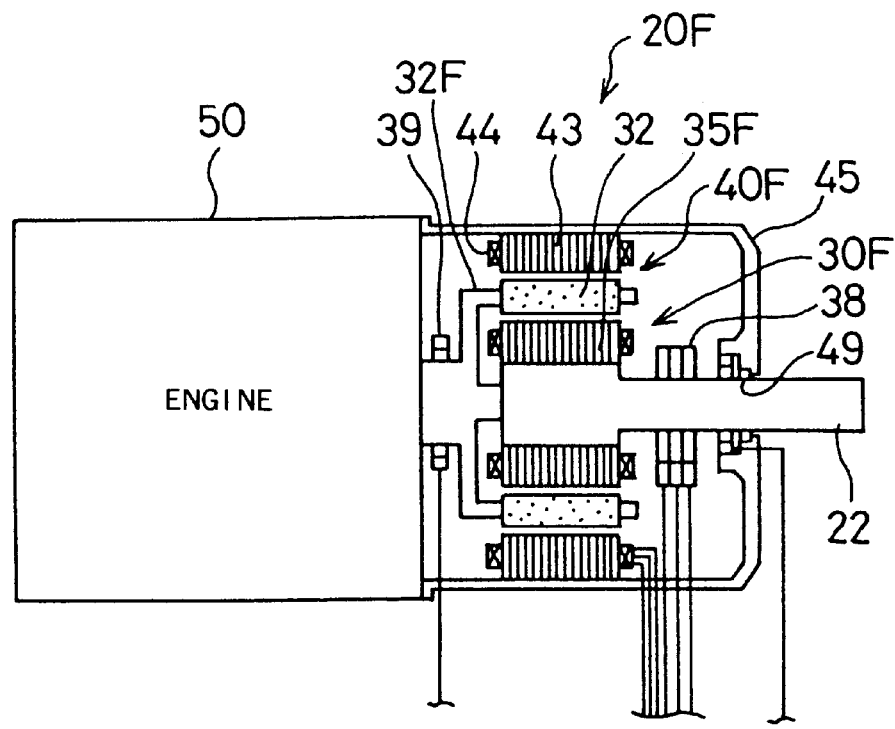
FIG. 18 schematically shows structure of another power output apparatus 20F as still another modification of the power output apparatus 20 of the first embodiment.

Like still another power output apparatus 20F illustrated in FIG. 18, the clutch motor and the assist motor may be integrally joined with each other. Referring to FIG. 18, in the power output apparatus 20F, an outer rotor 32F of a clutch motor 30F also works as a rotor of an assist motor 40F. The voltage applied to the three-phase coils 36 on the inner rotor 34 is controlled against the inner-surface magnetic pole of permanent magnets 35F set on the outer rotor 32F. This allows the clutch motor 30F to work in the same manner as the clutch motor 30 of the power output apparatus 20D shown in FIG. 16. The voltage applied to the three-phase coils 44 on the stator 43 is controlled against the outer-surface magnetic pole of the permanent magnets 35F set on the outer rotor 32F. This allows the assist motor 40F to work in the same manner as the assist motor 40 of the power output apparatus 20D. The power output apparatus 20F accordingly carries out the same operations and exerts the same effects as those in the power output apparatus 20D discussed above. In addition to the effects of the power output apparatus 20D, this modified structure has a further effect of reducing the size and weight of the whole power output apparatus 20F.

Figure 19:
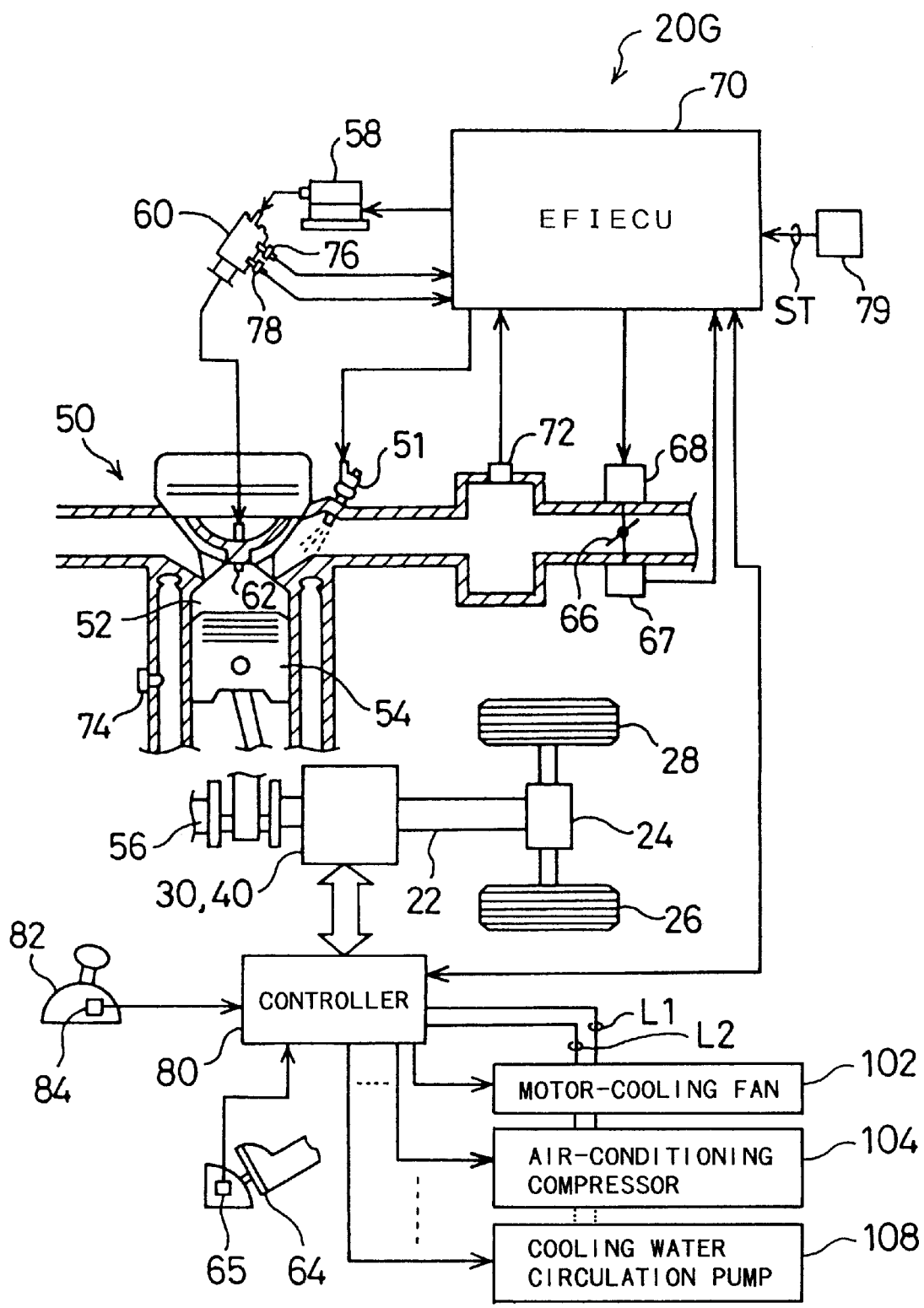
FIG. 19 schematically illustrates general structure of a vehicle with a power output apparatus 20G of a second embodiment incorporated therein.

The following describes another power output apparatus 20G as a second embodiment according to the present invention. FIG. 19 schematically illustrates general structure of a vehicle with the power output apparatus 20G of the second embodiment incorporated therein. The power output apparatus 20G of the second embodiment has a similar structure to that of the power output apparatus 20 of the first embodiment, except that connection of the power lines L1 and L2 with a motor-cooling fan 102, an air-conditioning compressor 104, a cooling water circulation pump 108 in the engine 50, and other related constituents mounted on the vehicle is clearly shown. The constituents of the power output apparatus 20G of the second embodiment that are identical with those of the power output apparatus 20 of the first embodiment are expressed by like numerals and not specifically described here. The numerals and symbols used in the description of the first embodiment have the same meanings in the description of the second embodiment, unless otherwise specified.

Figure 20:
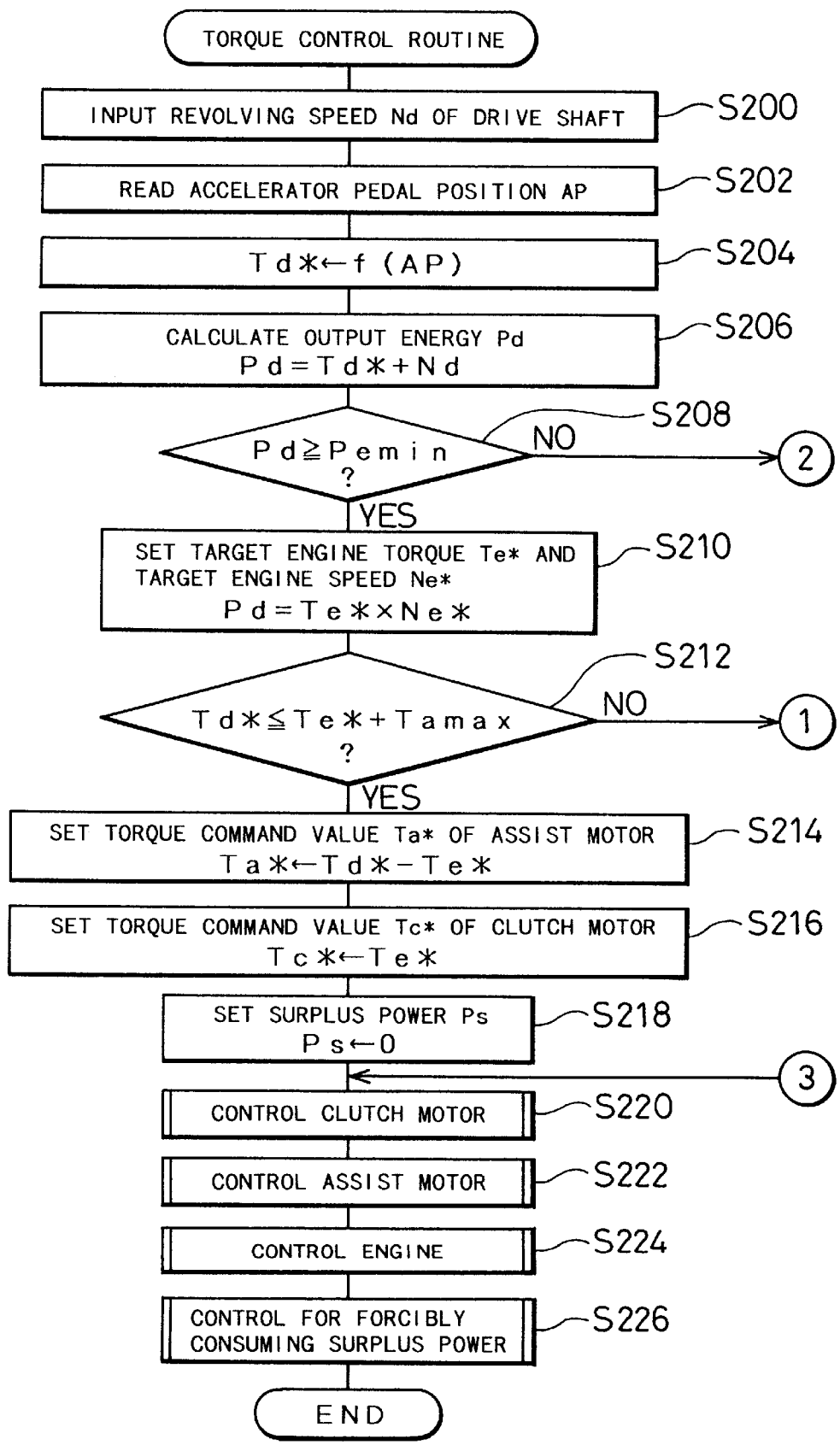
FIGS. 20 through 22 are flowcharts showing a torque control routine executed by the control CPU 90 of the controller 80 in the second embodiment.
Figure 21:
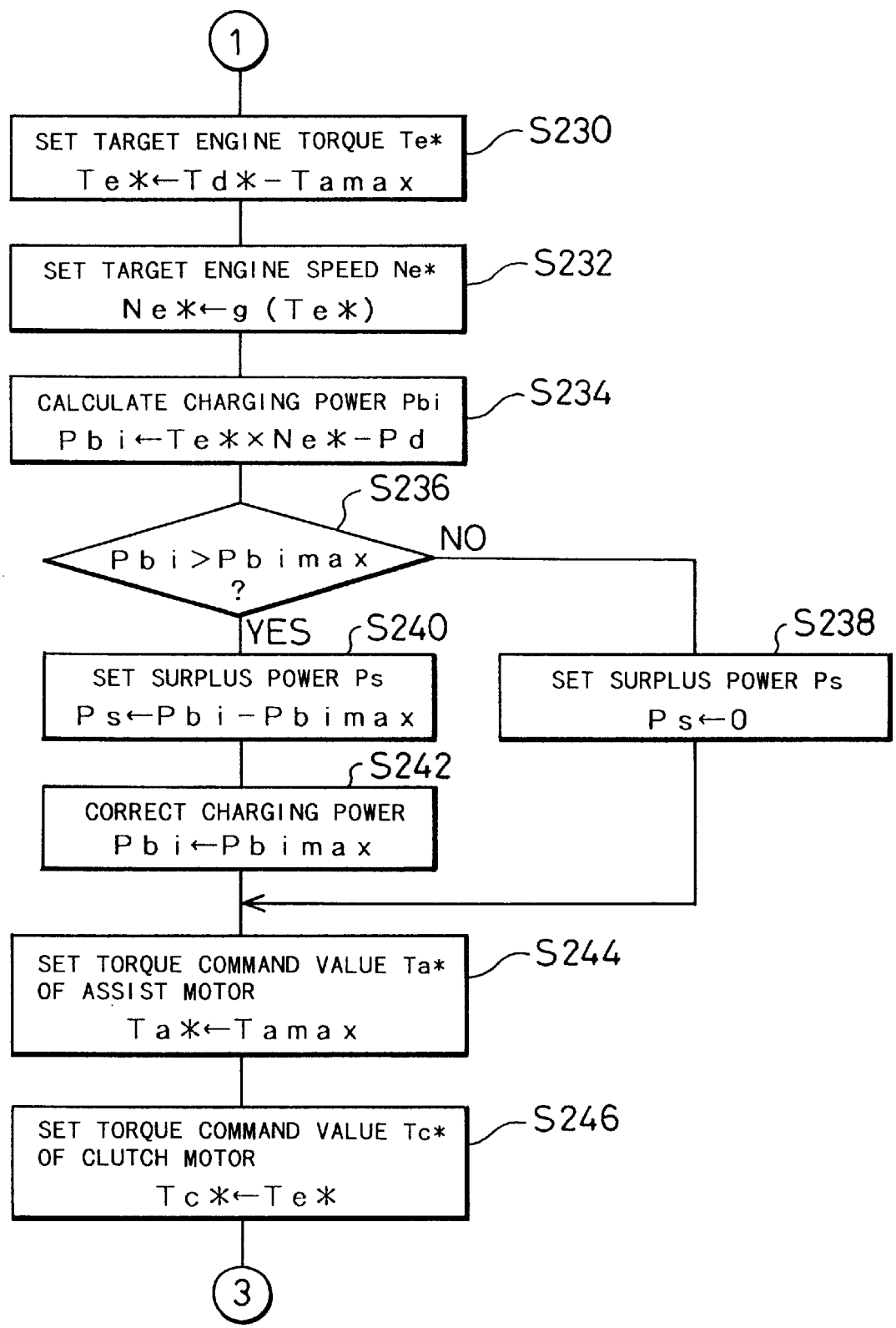
Figure 22:
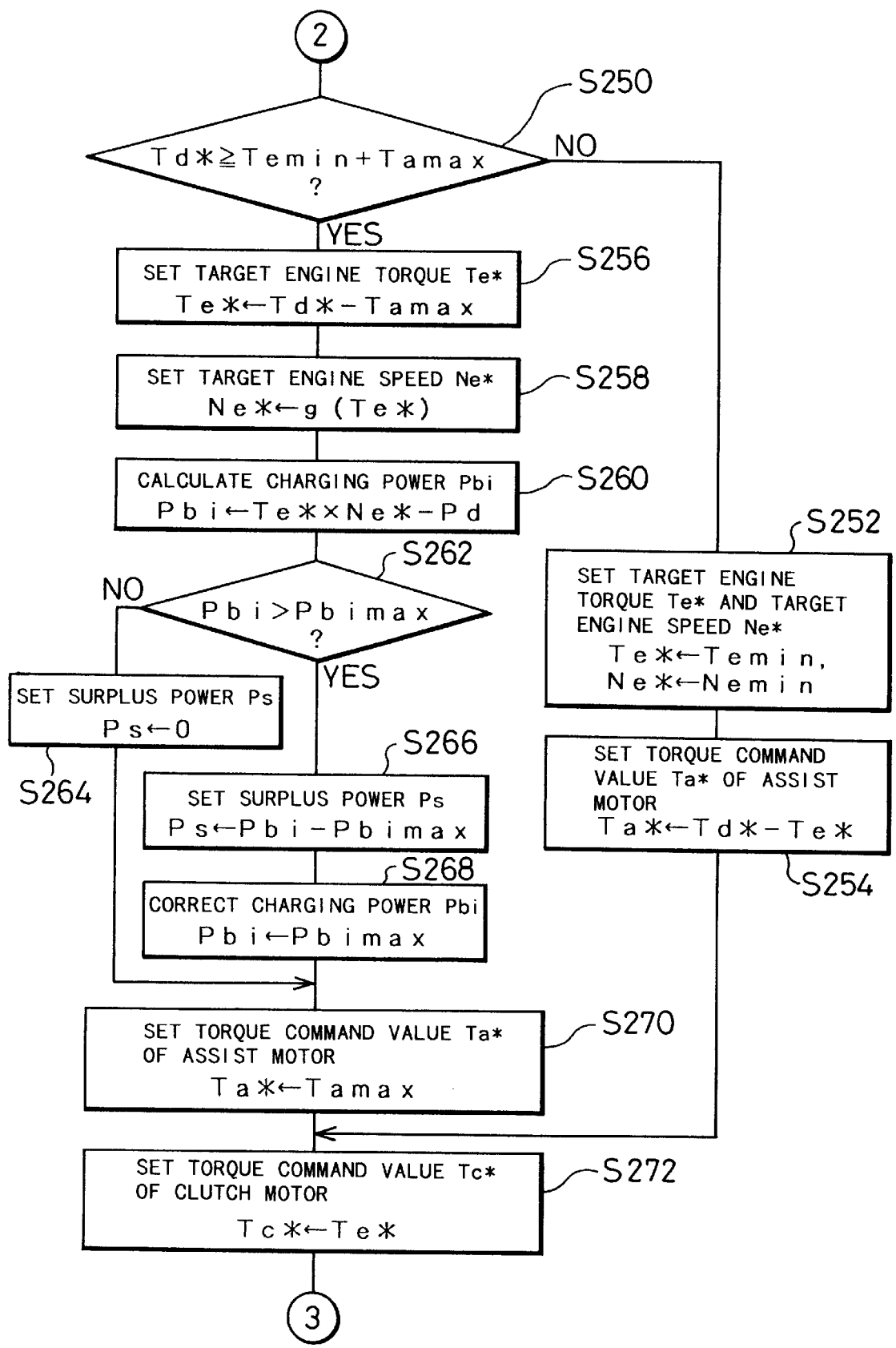

The power output apparatus 20G of the second embodiment carries out a torque control routine shown in the flowcharts of FIGS. 20 through 22, in place of the torque control routine of FIGS. 5 through 7 executed by the power output apparatus 20 of the first embodiment. The following describes the essential characteristics of the torque control executed in the power output apparatus 20G of the second embodiment, based on the torque control routine of FIGS. 20 through 22.

The processing shown in the flowchart of FIG. 20 is similar to that of FIG. 5, except that the process of setting a surplus power Ps equal to zero at step S218 and the control for forcibly consuming the surplus power at step S226, which will be discussed later.

When the output torque command value Td* is determined to be greater than the sum of the target torque Te* of the engine 50 and the maximum torque Tamax of the assist motor 40 at step S212 in the flowchart of FIG. 20, the program executes the processing of steps S230 through S236 in the flowchart of FIG. 21, which is identical with the processing of steps S130 through S136 in the flowchart of FIG. 6. The control CPU 90 of the controller 80 first calculates the target torque Te* of the engine 50 according to the equation of Te*=Td*−Tamax at step S230, reads the target engine speed Ne* corresponding to the target engine torque Te* from a map (for example, one shown in FIG. 8)

at step S232, calculates the charging power Pbi according to the equation of Pbi=Te*×Ne*−Pd at step S234, and compares the calculated charging power Pbi with the maximum chargeable power Pbimax at step S236.

When the charging power Pbi is equal to or smaller than the maximum chargeable power Pbimax at step S236, the program goes to step S238, at which a surplus power Ps is set equal to zero. When the charging power Pbi is greater than the maximum chargeable power Pbimax, on the contrary, the program goes to step S240 to set the surplus power Ps by subtracting the maximum chargeable power Pbimax from the charging power Pbi and then to step S242 to correct the charging power Pbi to the maximum chargeable power Pbimax. The surplus power Ps is calculated by subtracting the maximum chargeable power Pbimax from the charging power Pbi and accordingly represents a quantity of electric power exceeding the chargeable power of the battery 94. The program then carries out the processing of steps S244 and S246, which is identical with the processing of steps S140 and S142 in the flowchart of FIG. 6. Namely the control CPU 90 sets the torque command value Ta* of the assist motor 40 equal to the maximum torque Tamax at step S244 and sets the torque command value Tc* of the clutch motor 30 equal to the target engine torque Te* at step S246. The program then returns to steps S220 through S226 in the flowchart of FIG. 20 to control the clutch motor 30, the assist motor 40, and the engine 50 and to carry out the control for forcibly consuming the surplus power.

The control for forcibly consuming the surplus power forcibly activates power-consuming devices, such as the motor-cooling fan 102, the air-conditioning compressor 104, and the cooling water circulation pump 108, according to the value of the surplus power Ps, thereby consuming the surplus power Ps. In accordance with one concrete procedure, possible combinations of surplus power Ps, power-consuming device that consumes the surplus power Ps, and driving point of the power-consuming device are stored in advance as a map. An appropriate power-consuming device and its driving point corresponding to the preset surplus power Ps are read from the map, and the selected power-consuming device is forcibly activated and driven at the selected driving point. This allows consumption of the surplus power Ps. The power-consuming device is not limited to those mentioned above, but may be any other devices mounted on the vehicle or those having discharge resistance.

When the output energy Pd is determined to be less than the minimum output energy Pemin at step S208 in the flowchart of FIG. 20, the program carries out the processing of steps S250 through S272 in the flowchart of FIG. 22, which is similar to the processing of steps S150 through S168 in the flowchart of FIG. 7 except the processing of steps S262 through S268. The processing of steps S262 through S268 is identical with the processing of steps S236 through S242 in the flowchart of FIG. 21. When the output torque command value Td* is determined to be equal to or greater than the sum of the minimum torque Temin of the engine 50 and the maximum torque Tamax of the assist motor 40 at step S250 in the flowchart of FIG. 22, the control CPU 90 calculates the target torque Te* of the engine 50 according to the equation of Te*=Td*−Tamax at step S256, reads the target engine speed Ne* corresponding to the target engine torque Te* from a map (for example, one shown in FIG. 8) at step S258, and calculates the charging power Pbi according to the equation of Pbi=Te*×Ne*−Pd at step S260. When the calculated charging power Pbi is greater than the maximum chargeable power Pbimax at step S262, the control CPU 90 calculates the surplus power Ps according to the equation of Ps=Pbi−Pbimax at step S266 and corrects the charging power Pbi to the maximum chargeable power Pbimax at step S268.

In the power output apparatus 20G of the second embodiment discussed above, in case that the required torque Td* to the drive shaft 22 is significantly large and can thus not be output from the engine 50, the clutch motor 30, or the assist motor 40 under the condition that the energy Pe output from the engine 50 is identical with the output energy Pd required to be output to the drive shaft 22, the energy Pe output from the engine 50 is set to be greater than the output energy Pd required to be output to the drive shaft 22. This enables the required torque Td* to be output from the engine 50, the clutch motor 30, and the assist motor 40. The excess energy generated at this moment is stored temporarily in the battery 94 and later utilized by the clutch motor 30 or the assist motor 40. This structure further improves the energy efficiency of the whole power output apparatus 20G. As mentioned above, the energy Pe output from the engine 50 is made greater than the output energy Pd required to be output to the drive shaft 22, in order to enable the engine 50, the clutch motor 30, and the assist motor 40 to output the required torque Td* to the drive shaft 22. When this causes the excess energy to be greater the maximum chargeable power Pbimax of the battery 94, the surplus power Ps exceeding the maximum chargeable power Pbimax is consumed by the power-consuming devices, such as the motor-cooling fan 102, the air-conditioning compressor 104, and the cooling water circulation pump 108. This procedure effectively prevents the battery 94 from being damaged by charging with the excessively large electric power.

As discussed above, the power output apparatus 20G of the second embodiment enables the power output from the engine 50 to be converted to a required torque and output to the drive shaft 22 by means of the clutch motor 30 and the assist motor 40. The structure of the first embodiment allows the engine to be driven at driving points with high efficiency, thereby improving the efficiency of the whole power output apparatus 20G.

In the power output apparatus 20G of the second embodiment, the charging power Pbi is compared with the maximum chargeable power Pbimax, and is corrected to the maximum chargeable power Pbimax when Pbi exceeds Pbimax. In accordance with another possible structure, however, the charging power Pbi is compared with a predetermined value that is equal to or less than the maximum chargeable power Pbimax, and is corrected to the predetermined value when Pbi exceeds the predetermined value.

Although the assist motor 40 is directly attached to the drive shaft 22 in the power output apparatus 20G of the second embodiment, the assist motor 40 may be attached to a shaft which is separate from the drive shaft 22 but linked with the drive shaft 22 via a gear. In this latter structure, the properties of the assist motor 40 can be varied by selecting the gear ratio. Like the power output apparatuses 20A and 20B of modified structures shown in FIGS. 13 and 14, the assist motor 40A may be interposed between the engine 50 and the clutch motor 30A, wherein the rotor 42A of the assist motor 40A is connected to the outer rotor 32A of the clutch motor 30A, which is further linked with the drive shaft 22. As another possible structure, the clutch motor and the assist motor may be integrally joined with each other, like the power output apparatus 20C of modified structure illustrated in FIG. 15.

Although the assist motor 40 is attached to the drive shaft 22 in the power output apparatus 20G of the second embodiment, the assist motor 40 may be attached to the crankshaft 56 of the engine 50, like the power output apparatuses 20D and 20E of modified structures shown in FIGS. 16 and 17. When the torque control routine of FIGS. 20 through 22 is applied to these modified structures where the assist motor 40 is attached to the crankshaft 56 of the engine 50, the torque command value Tc* of the clutch motor 30 is set equal to the output torque command value Td* instead of the target engine torque Te* at steps S216, S246, and S272. As another possible structure, the clutch motor and the assist motor may be integrally joined with each other, like the power output apparatus 20F of modified structure illustrated in FIG. 18.

In the power output apparatus 20G of the second embodiment, when the charging power Pbi exceeds the maximum chargeable power Pbimax, the charging power Pbi is corrected to the maximum chargeable power Pbimax, while the excess energy is consumed as the surplus power Ps by the power-consuming devices. In accordance with one alternative structure, when the charging power Pbi exceeds the maximum chargeable power Pbimax, the driving point of the engine 50 is changed to decrease the energy Pe output from the engine 50 by lowering the revolving speed Ne of the engine 50 while keeping the torque Te unchanged, as described in the torque control of the power output apparatus 20 of the first embodiment. When the charging power Pbi still exceeds the maximum chargeable power Pbimax even after this process, the charging power Pbi is corrected to the maximum chargeable power Pbimax, while the excess energy is consumed as the surplus power Ps by the power-consuming devices. This alternative structure has the effects of both the power output apparatus 20 of the first embodiment and the power output apparatus 20G of the second embodiment.

Figure 23:
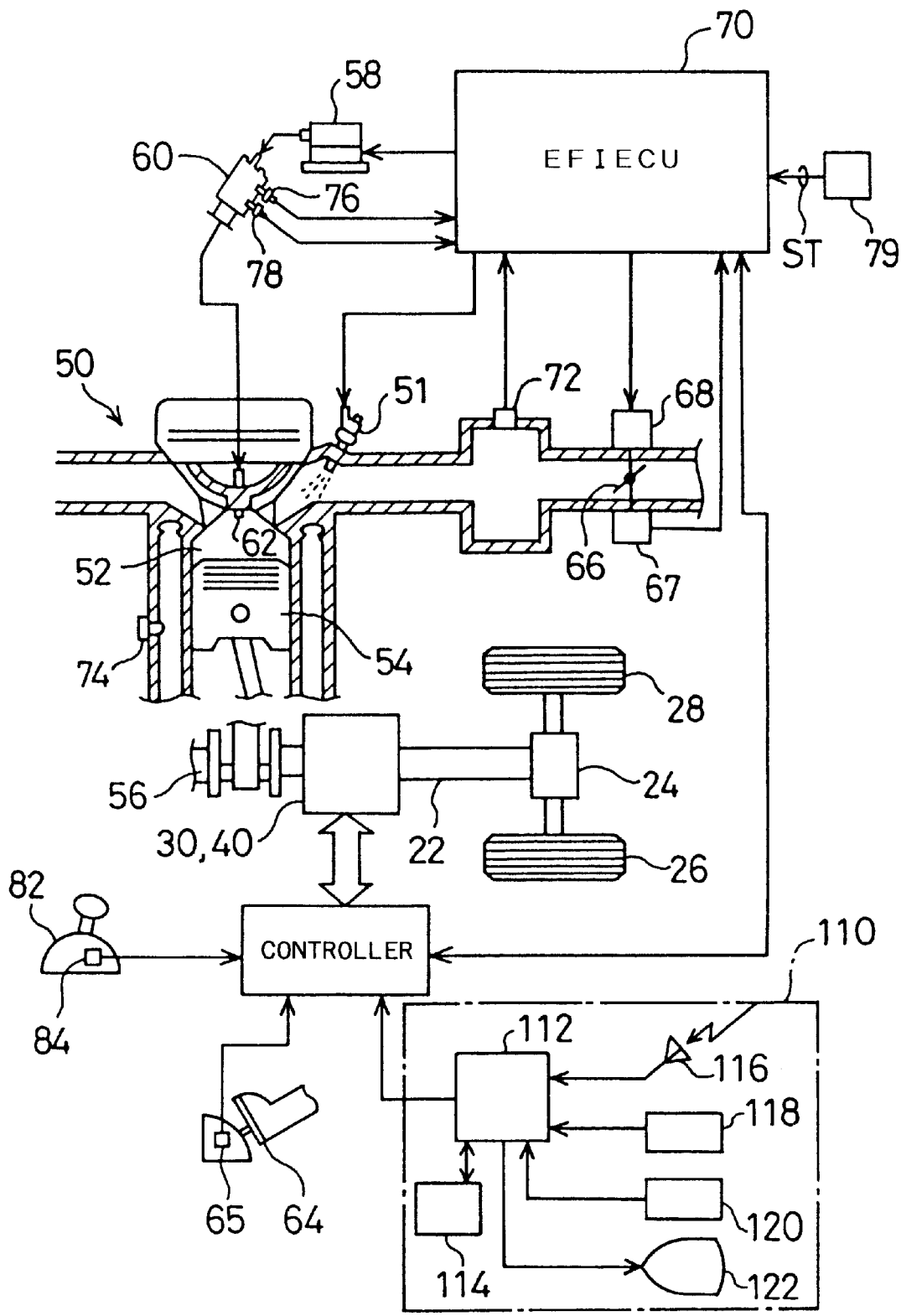
FIG. 23 schematically illustrates general structure of a vehicle with a power output apparatus 20H of a third embodiment incorporated therein.

The following describes another power output apparatus 20H as a third embodiment according to the present invention. FIG. 23 schematically illustrates general structure of a vehicle with the power output apparatus 20H of the third embodiment incorporated therein. The power output apparatus 20H of the third embodiment has a similar structure to that of the power output apparatus 20 of the first embodiment, except a navigation system 110 that outputs information regarding the current position and the running direction of the vehicle based on signals from a GPS (global positioning system) satellite and map information. The constituents of the power output apparatus 20H of the third embodiment that are identical with those of the power output apparatus 20 of the first embodiment are expressed by like numerals and not specifically described here. The numerals and symbols used in the description of the first embodiment have the same meanings in the description of the third embodiment, unless otherwise specified.

The navigation system 110 incorporated in the power output apparatus 20H of the third embodiment includes a map information storage device 114 for storing map information, such as roads, the names of places, main buildings, and topographical data, a navigation aerial 116 for receiving signals from the GPS satellite, a gyro sensor 118 for measuring an angle of running direction of the vehicle, a vehicle speed sensor 120 for measuring a vehicle speed, a display panel 122 for displaying the map information as well as the current position and the running direction of the vehicle, and a navigation control device 112. The navigation system 110 combines radio navigation that measures the current position of the vehicle based on the signals sent from the GPS satellite with self-contained navigation that measures the moving distance and the running direction of the vehicle with the gyro sensor 118 and the vehicle speed sensor 120. The navigation system 110 calculates the current position and the running direction of the vehicle, the vehicle speed, available routes to a destination, and time periods required to arrive at the destination, and outputs these data with the map information to the display panel 122.

A variety of data including topographical data, data of roads and main buildings, and data of steep slope areas that represent predetermined ranges around points having predetermined or greater gradients (for example, gradients of not less than 10%) are stored as the map information in the map information storage device 114. Although not being illustrated, the navigation control device 112 is constructed as an arithmetic and logical operations circuit including a CPU, a ROM, a RAM, an input circuit for receiving data sent from the vehicle speed sensor 120 and the map information storage device 114, and an output circuit for outputting the map information as well as the results of operations including the current position and the running direction of the vehicle to the display panel 122 and the controller 80.

Figure 24:
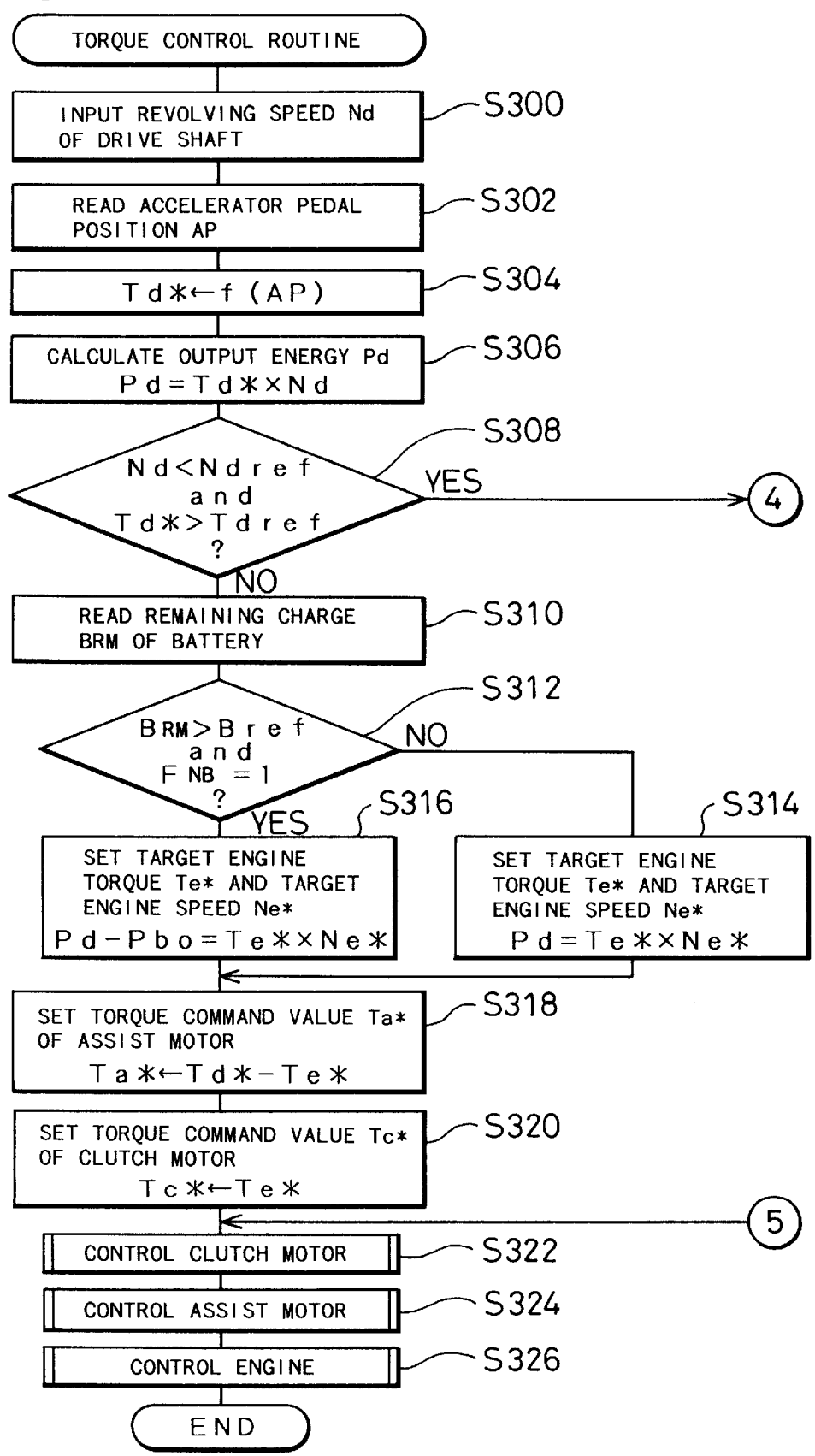
FIGS. 24 and 25 are flowcharts showing a torque control routine executed by the control CPU 90 of the controller 80 in the third embodiment.
Figure 25:
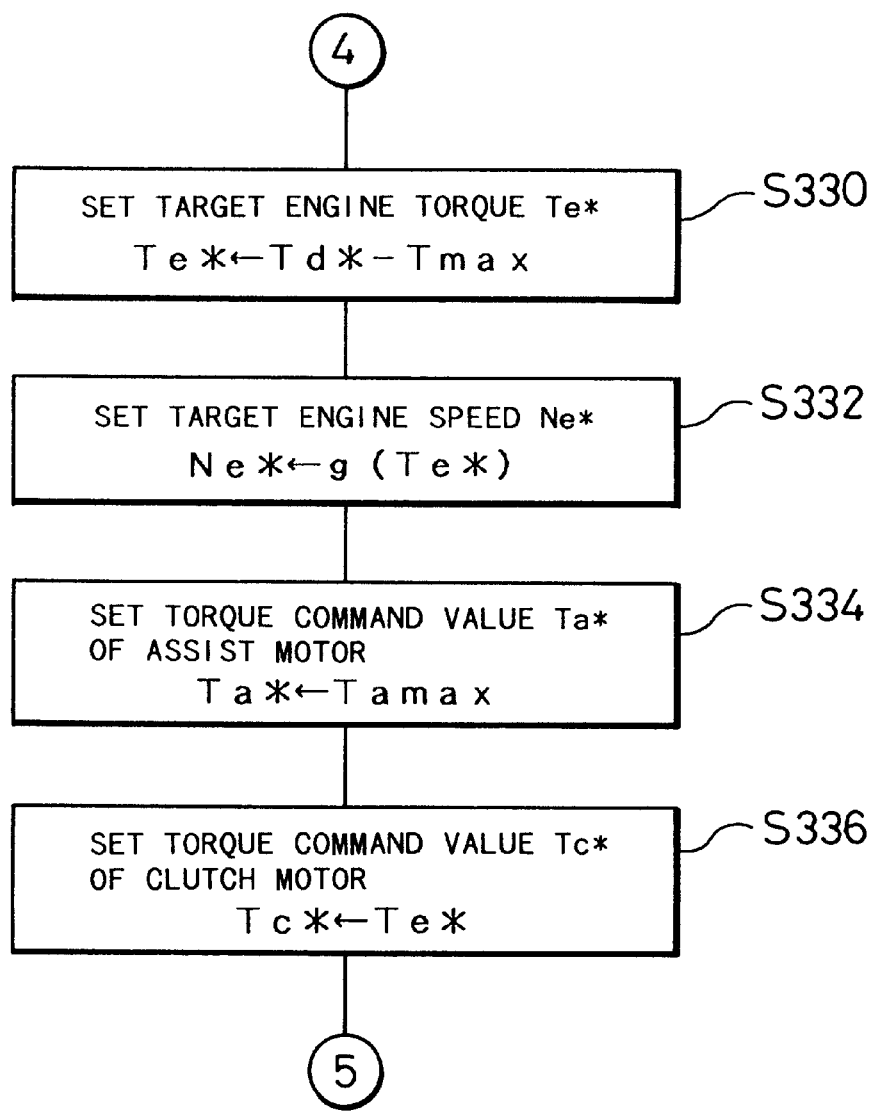

The power output apparatus 20H of the third embodiment thus constructed carries out a torque control routine shown in the flowcharts of FIGS. 24 and 25. The following describes the essential characteristics of the torque control executed in the power output apparatus 20H of the third embodiment, based on the torque control routine of FIGS. 24 and 25.

When the program enters the torque control routine, the control CPU 90 of the controller 80 first receives data of revolving speed Nd of the drive shaft 22 and accelerator pedal position AP at steps S300 and S302, respectively. The control CPU 90 then calculates the output torque command value Td* from the input accelerator pedal position AP at step S304, calculates the output energy Pd according to the equation of Pd=Td*×Nd at step S306, and determines whether or not the revolving speed Nd is lower than a threshold value Ndref and whether or not the output torque command value Td* is greater than a threshold value Tdref at step S308. The condition of lower revolving speed Nd and larger output torque command value Td* is recognized as a state that requires making the energy Pe output from the engine 50 greater than the output energy Pd needed to be output to the drive shaft 22 and thereby charges the battery 94 with the resulting excess energy. This enables the engine 50, the clutch motor 30, and the assist motor 40 to output the required torque Td* to the drive shaft 22. The threshold values Ndref and Tdref respectively represent the revolving speed Nd and the output torque command value Td* set as lower limits of this state. In the third embodiment, the threshold value Ndref is set to be a little higher than the minimum revolving speed Nemin of the engine 50 in the graph of FIG. 8, whereas the threshold value Tdref is set equal to the sum of the minimum torque Temin of the engine 50 and the maximum torque Tamax of the assist motor 40 shown in FIG. 8.

When it is determined that the revolving speed Nd is lower than the threshold value Ndref and the output torque command value Td* is greater than the threshold value Tdref at step S308, the program carries out the processing of steps S330 through S336 shown in the flowchart of FIG. 25. When it is determined that either the revolving speed Nd is not lower than the threshold value Ndref or the output torque command value Td* is not greater than the threshold value Tdref at step S308, on the other hand, the program carries out the processing of steps S310 through S320 in the flowchart of FIG. 24. The following describes first the processing executed when either the revolving speed Nd is not lower than the threshold value Ndref or the output torque command value Td* is not greater than the threshold value Tdref and then the processing executed when the revolving speed Nd is lower than the threshold value Ndref and the output torque command value Td* is greater than the threshold value Tdref.

Figure 26:
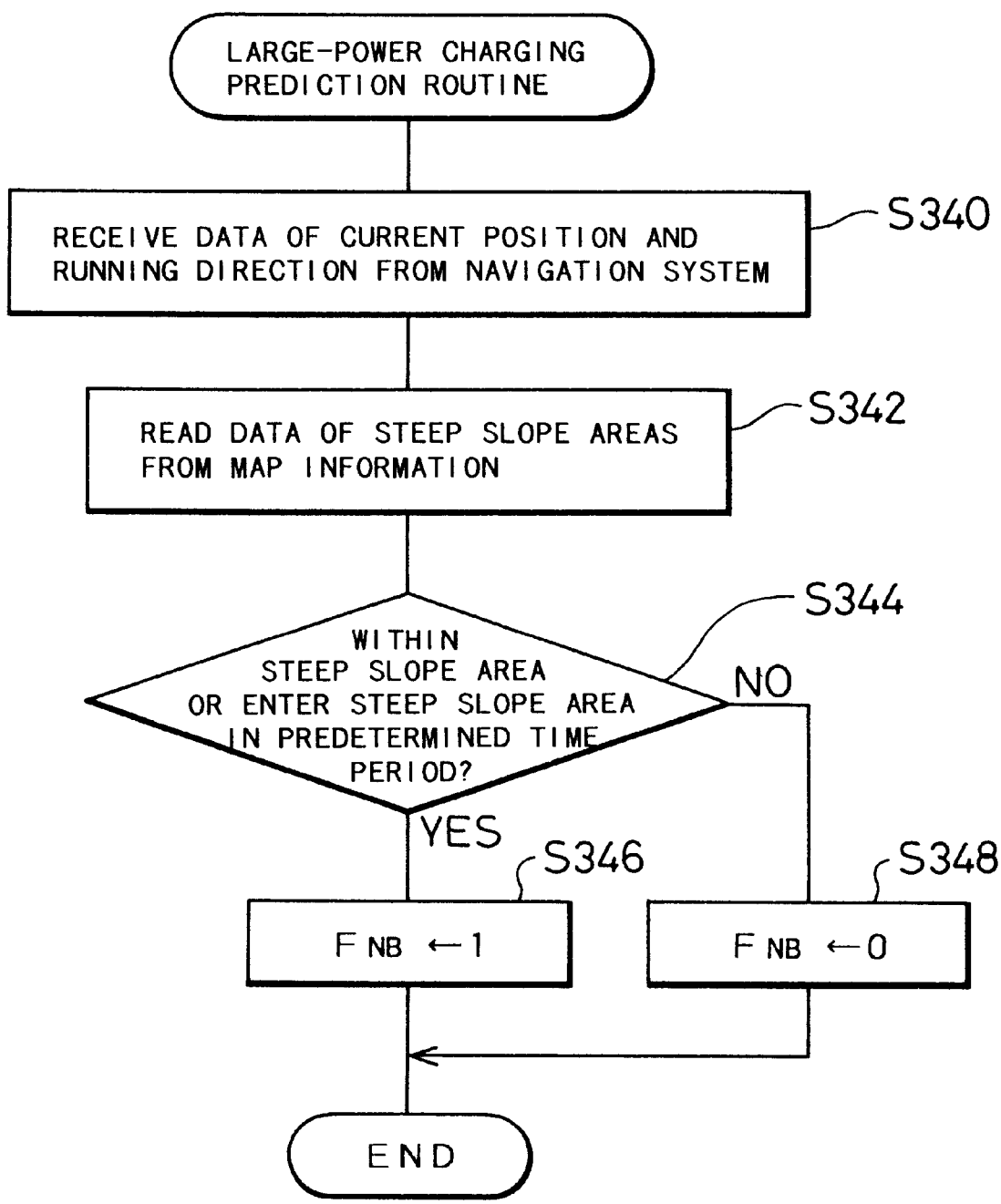
FIG. 26 is a flowchart showing a large-power charging prediction routine executed by the control CPU 90 of the controller 80 in the third embodiment.

When it is determined that either the revolving speed Nd is not lower than the threshold value Ndref or the output torque command value Td* is not greater than the threshold value Tdref at step S308, the control CPU 90 reads the data of remaining charge BRM of the battery 94 at step S310, and determines whether or not the remaining charge BRM is greater than a threshold value Bref and whether or not a large-power charging prediction flag FNB is set equal to the value '1' at step S312. The threshold value Bref is set as the remaining charge BRM that allows the battery 94 to be charged with predicted large power, and takes a value depending upon the type, capacity, and properties of the battery 94. The large-power charging prediction flag FNB shows whether or not there is a possibility of charging the battery 94 with large power, and is set in a large-power charging prediction routine (shown in the flowchart of FIG. 26) that is carried out repeatedly at predetermined time intervals. When the program enters the large-power charging prediction routine of FIG. 26, the control CPU 90 of the controller 80 first receives data of current position and running direction of the vehicle from the navigation control device 112 of the navigation system 110 at step S340, and then receives data of steep slope areas near the current position of the vehicle from the map information storage device 114 via the navigation control device 112 at step S342. It is then determined at step S344 whether or not the current position of the vehicle is within a steep slope area or whether or not the vehicle is expected to enter a steep slope area in a predetermined time period. When it is determined that either the current position of the vehicle is within a steep slope area or the vehicle is expected to enter a steep slope area in a predetermined time period, the program determines that the battery 94 is expected to be charged with large electric power and goes to step S346 to set the large-power charging prediction flag FNB equal to the value '1'. When it is determined that the current position of the vehicle is not within any steep slope area and the vehicle is not expected to enter any steep slope area in a predetermined time period, on the contrary, the program determines that the battery 94 is not expected to be charged with large electric power and goes to step S348 to set the large-power charging prediction flag FNB equal to the value '0'.

Referring back to the flowchart of FIG. 24, when it is determined that the remaining charge BRM of the battery 94 is greater than the threshold value Bref and that the large-power charging prediction flag FNB is set equal to the value '1' at step S312, the program determines that the current state does not allow the battery 94 to be charged with the predicted large power, although the current state is within a specific range for predicting that the battery 94 would be charged with large power or otherwise is expected to enter the specific range in a predetermined time period. The program accordingly proceeds to step S316 to set the target torque Te* and the target revolving speed Ne* of the engine 50 by subtracting a discharging power Pbo from the output energy Pd and referring to a preset map (for example, one shown in FIG. 8). Namely the target engine torque Te* and the target engine speed Ne* are determined in order to satisfy the equation of Pd−Pbo=Te*×Ne*. The discharging power Pbo represents electric power discharged from the battery 94, and takes a value depending upon the type, the capacity, and the properties of the battery 94. This process of setting the target engine torque Te* and the target engine speed Ne* makes the energy Pe output from the engine 50 smaller than the output energy Pd and allows the insufficient energy to be compensated by the electric power discharged from the battery 94, thereby enabling the remaining charge BRM of the battery 94 to be equal to or less than the threshold value Bref.

When it is determined that the remaining charge BRM of the battery 94 is not greater than the threshold value Bref or that the large-power charging prediction flag FNB is set equal to the value '0' at step S312, on the other hand, the program determines that the current state allows the battery 94 to be charged with the predicted large power or otherwise does not predict that the battery 94 would be charged with large power. The program accordingly proceeds to step S314 to read an adequate combination of the target torque Te* and the target revolving speed Ne* of the engine 50 corresponding to the output energy Pd from a preset map (for example, one shown in FIG. 8). In this case, the target engine torque Te* and the target engine speed Ne* are determined in order to satisfy the equation of Pd=Te*×Ne* and to make the energy Pe output from the engine 50 equal to the output energy Pd.

The control CPU 90 subsequently subtracts the target engine torque Te* from the output torque command value Td* and sets the difference as the torque command value Ta* of the assist motor 40 at step S318, and sets the torque command value Tc* of the clutch motor 30 equal to the target engine torque Te* at step S320. After setting the target values and torque command values, the program goes to steps S322, S324 and S326 to control the clutch motor 30, the assist motor 40, and the engine 50. The concrete procedures of controlling the clutch motor 30, the assist motor 40, and the engine 50 carried out at steps S322 through S326 are identical with those executed at steps S118 through S122 in the torque control routine of the first embodiment shown in the flowchart of FIG. 5.

When the revolving speed Nd is lower than the threshold value Ndref and the output torque command value Td* is greater than the threshold value Tdref at step S308 in the flowchart of FIG. 24, the program carries out the processing of steps S330 through S336 shown in the flowchart of FIG. 25. The control CPU 90 first subtracts the maximum torque Tamax of the assist motor 40 from the output torque command value Td* and sets the difference as the target torque Te* of the engine 50 at step S330, and reads the target revolving speed Ne* of the engine 50 corresponding to the calculated target torque Te* from a preset map (for example, one shown in FIG. 8) at step S332. The control CPU 90 subsequently sets the torque command value Ta* of the assist motor 40 equal to the maximum torque Tamax at step S334 and sets the torque command value Tc* of the clutch motor 30 equal to the target torque Te* of the engine 50 at step S336. After setting the target values and torque command values, the program returns to steps S322 through S326 in the flowchart of FIG. 24 to control the clutch motor 30, the assist motor 40, and the engine 50.

In the power output apparatus 20H of the third embodiment discussed above, in case that the required torque Td* to the drive shaft 22 is significantly large and can thus not be output from the engine 50, the clutch motor 30, or the assist motor 40 under the condition that the energy Pe output from the engine 50 is identical with the output energy Pd required to be output to the drive shaft 22, the energy Pe output from the engine 50 is set to be greater than the output energy Pd required to be output to the drive shaft 22. This enables the required torque Td* to be output from the engine 50, the clutch motor 30, and the assist motor 40. The excess energy generated at this moment is stored temporarily in the battery 94 and later utilized by the clutch motor 30 or the assist motor 40. This structure further improves the energy efficiency of the whole power output apparatus 20H. As mentioned above, when the vehicle is within a steep slope area or is expected to enter a steep slope area in a predetermined time period, the structure of the third embodiment predicts that the battery 94 would be charged with large power and adjusts the remaining charge BRM of the battery 94 in order to allow the battery 94 to be charged with the predicted large power. This procedure effectively prevents the battery 94 from being damaged by charging with the excessively large electric power.

The power output apparatus 20H of the third embodiment is provided with the navigation system 110 that has the map information and determines the current position and the running direction of the vehicle based on signals sent from the GPS satellite and the gyro sensor 118. The structure of the third embodiment utilizes this navigation system 110 to predict with a higher accuracy that the battery 94 would be charged with large power.

As discussed above, the power output apparatus 20H of the third embodiment enables the power output from the engine 50 to be converted to a required torque and output to the drive shaft 22 by means of the clutch motor 30 and the assist motor 40. The structure of the first embodiment allows the engine to be driven at driving points with high efficiency, thereby improving the efficiency of the whole power output apparatus 20H.

The power output apparatus 20H of the third embodiment has the navigation system 110 that has the map information and combines radio navigation for measuring the current position of the vehicle based on the signals sent from the GPS satellite with self-contained navigation for measuring the moving distance and the running direction of the vehicle with the gyro sensor 118 and the vehicle speed sensor 120, so as to calculate the current position and the running direction of the vehicle, the vehicle speed, available routes to a destination, and time periods required to arrive at the destination. Any navigation system that has map information and accurately measures the current position and the running direction of the vehicle and the other required data may, however, be applied to the power output apparatus 20H.

Figure 27:
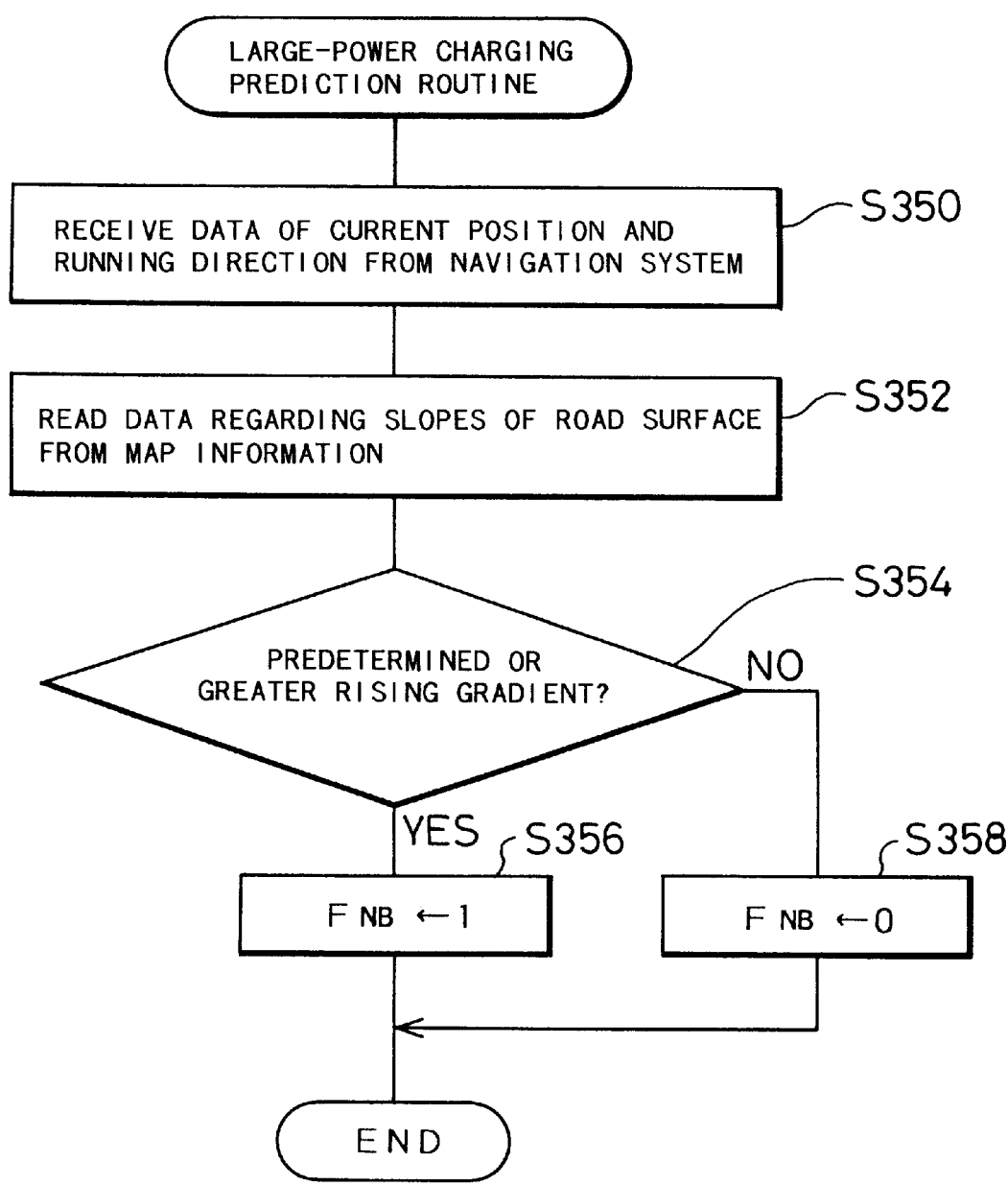
FIG. 27 is a flowchart showing another large-power charging prediction routine.

The power output apparatus 20H of the third embodiment receives data regarding the current position and the running direction of the vehicle and steep slope areas from the navigation system 110, determines whether or not the vehicle is within a steep slope area or is expected to enter a steep slope area in a predetermined time period, and predicts that the battery 94 would be charged with large electric power, based on the result of determination. Prediction of charging the battery 94 with large electric power may be carried out by executing a large-power charging prediction routine shown in the flowchart of FIG. 27, in place of the large-power charging prediction routine shown in the flowchart of FIG. 26. When the program enters the routine of FIG. 27, the control CPU 90 first receives data regarding the current position and the running direction of the vehicle and slopes of the road surface from the navigation system 110 at steps S350 and S352. When it is determined that the vehicle is running on a slope having a predetermined or greater rising gradient at step S354, the program determines that the battery 94 is expected to be charged with large electric power and proceeds to step S356 to set the large-power charging prediction flag FNB equal to the value '1'. When it is determined that the vehicle is running on the road surface having the rising gradient less than the predetermined value at step S354, on the contrary, the program determines that the battery 94 is not expected to be charged with large electric power and proceeds to step S358 to set the large-power charging prediction flag FNB equal to the value '0'.

Figure 28:
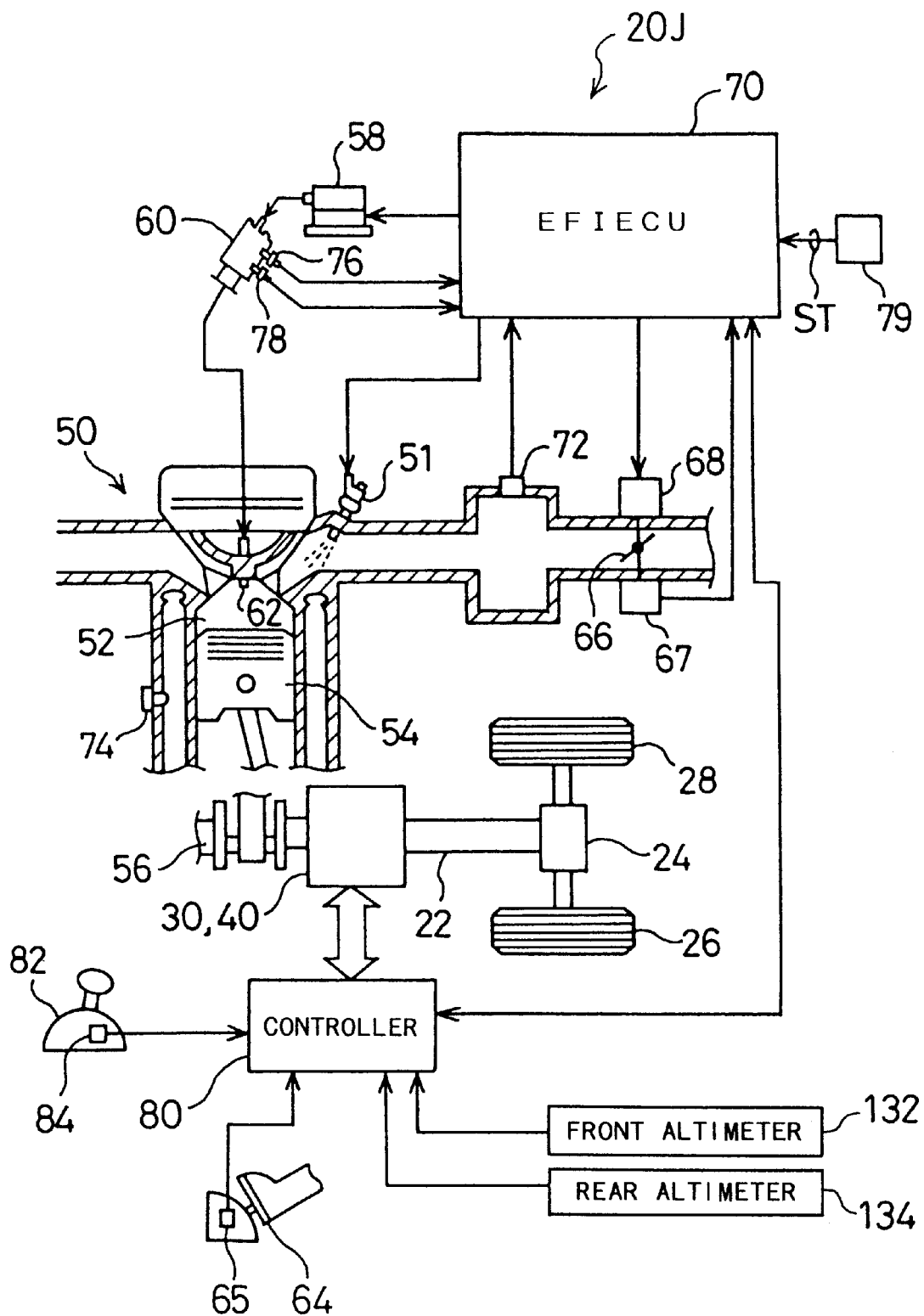
FIG. 28 schematically illustrates general structure of a vehicle with a power output apparatus 20J, which is a modification of the third embodiment, incorporated therein.
Figure 29:
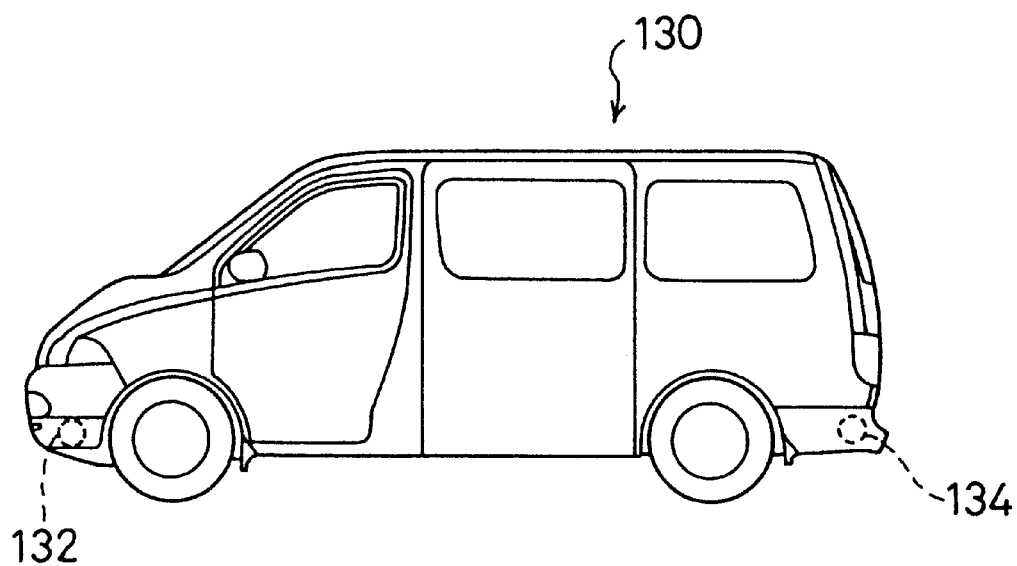
FIG. 29 shows positions of a front altimeter 132 and a rear altimeter 134 in a vehicle 130 having the power output apparatus 20J of FIG. 28 mounted thereon.
Figure 30:
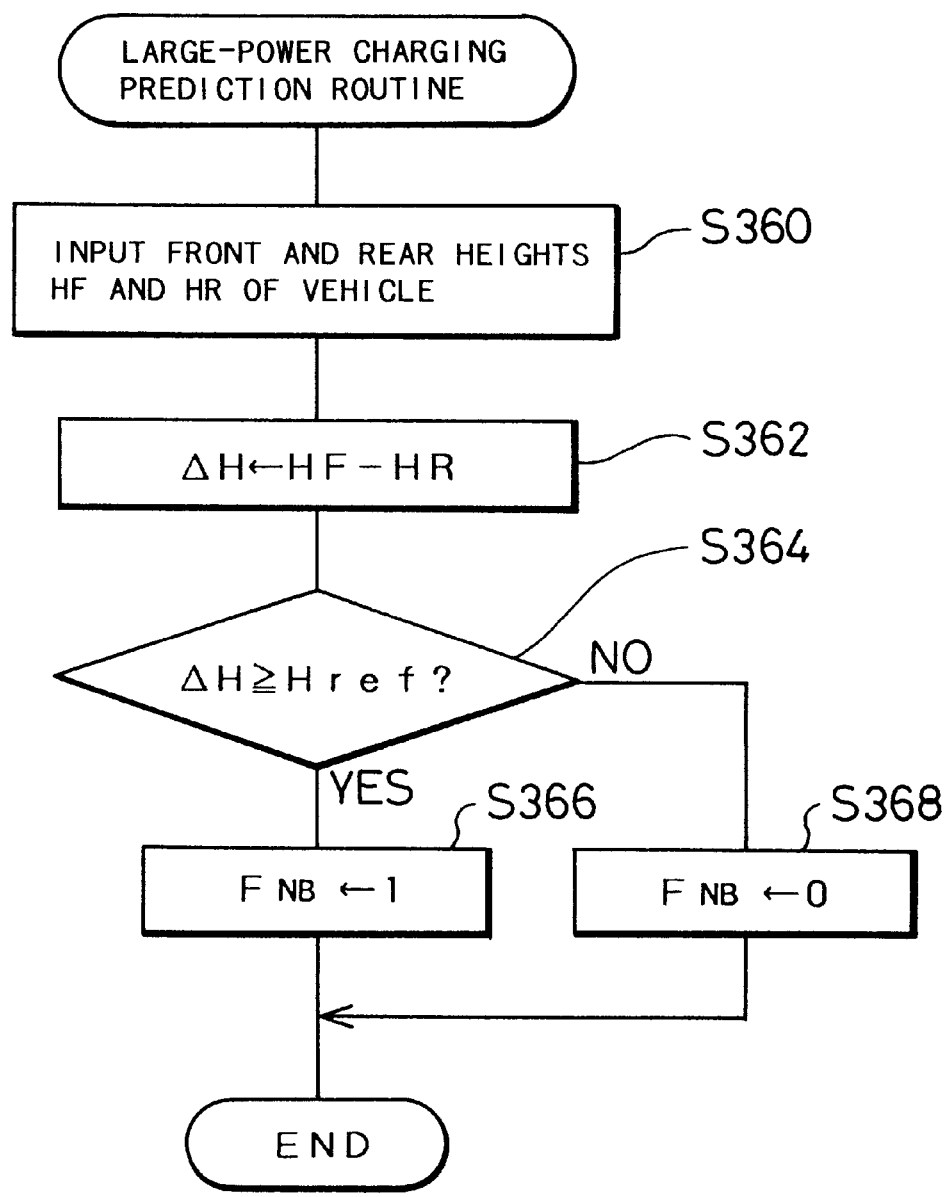
FIG. 30 is a flowchart showing a large-power charging prediction routine executed by the power output apparatus 20J.

The power output apparatus 20H of the third embodiment utilizes the navigation system 110 to determine whether or not the battery 94 is expected to be charged with large electric power. In accordance with an alternative structure, however, the prediction of charging the battery 94 with large electric power is implemented without the navigation system 110. FIG. 28 schematically illustrates a power output apparatus 20J of this alternative structure, and FIG. 29 shows a vehicle 130 with the power output apparatus 20J of FIG. 28 mounted thereon. The power output apparatus 20J has a front altimeter 132 for measuring a height HF on the front portion of the vehicle 130 and a rear altimeter 134 for measuring a height HR on the rear portion of the vehicle 130. This structure determines that the battery 94 is expected to be charged with large electric power, when the vehicle 130 is running on a slope having a predetermined or greater rising gradient. The power output apparatus 20J carries out a large-power charging prediction routine shown in the flowchart of FIG. 30, instead of the large-power charging prediction routine of FIG. 26. When the program enters the routine of FIG. 30, the control CPU 90 first receives data of the front height HF and the rear height HR of the vehicle 130 measured with the front altimeter 132 and the rear altimeter 134 at step S360, and subtracts the rear height HR from the front height HF of the vehicle 130 to yield a height difference ΔH at step S362. When the height difference ΔH is equal to or greater than a threshold value Href at step S364, the program determines that the vehicle 130 is running on a slope having a predetermined or greater rising gradient and thereby the battery 94 is expected to be charged with large electric power and proceeds to step S366 to set the large-power charging prediction flag FNB equal to the value '1'. When the height difference ΔH is smaller than the threshold value Href at step S364, on the other hand, the program determines that the vehicle 130 is running on the road surface having the rising gradient less than the predetermined value and thereby the battery 94 is not expected to be charged with large electric power and proceeds to step S368 to set the large-power charging prediction flag FNB equal to the value '0'. The threshold value Href is set to represent the predetermined rising gradient, for example, a rising gradient of 10%.

Other than the process of detecting the running state of the vehicle based on the data regarding the slopes of the road surface sent from the navigation system and the process of detection based on the data measured with altimeters attached to the front portion and the rear portion of the vehicle discussed above, a variety of techniques are available for determining whether or not the vehicle is running on a slope having a predetermined or greater rising gradient, such as the process of detection based on signals sent from a gyro sensor attached to the vehicle for measuring front and rear inclinations of the vehicle.

Like the power output apparatus 20 of the first embodiment, the assist motor 40 is directly attached to the drive shaft 22 in the power output apparatus 20H of the third embodiment. The assist motor 40 may, however, be attached to a shaft which is separate from the drive shaft 22 but linked with the drive shaft 22 via a gear. In this latter structure, the properties of the assist motor 40 can be varied by selecting the gear ratio. Like the power output apparatuses 20A and 20B of modified structures shown in FIGS. 13 and 14, the assist motor 40A may be interposed between the engine 50 and the clutch motor 30A, wherein the rotor 42A of the assist motor 40A is connected to the outer rotor 32A of the clutch motor 30A, which is further linked with the drive shaft 22. As another possible structure, the clutch motor and the assist motor may be integrally joined with each other, like the power output apparatus 20C of modified structure illustrated in FIG. 15.

The assist motor 40 may alternatively be attached to the crankshaft 56 of the engine 50, like the power output apparatuses 20D and 20E of modified structures shown in FIGS. 16 and 17. When the torque control routine of FIGS. 24 and 25 is applied to these modified structures where the assist motor 40 is attached to the crankshaft 56 of the engine 50, the torque command value Tc* of the clutch motor 30 is set equal to the output torque command value Td* instead of the target engine torque Te* at steps S320 and S336. As another possible structure, the clutch motor and the assist motor may be integrally joined with each other, like the power output apparatus 20F of modified structure illustrated in FIG. 18.

The present invention is not restricted to the above embodiments or applications, but there may be many modifications, changes, and alterations without departing from the scope or spirit of the main characteristics of the present invention. Some examples of possible modification are given below.

Figure 31:
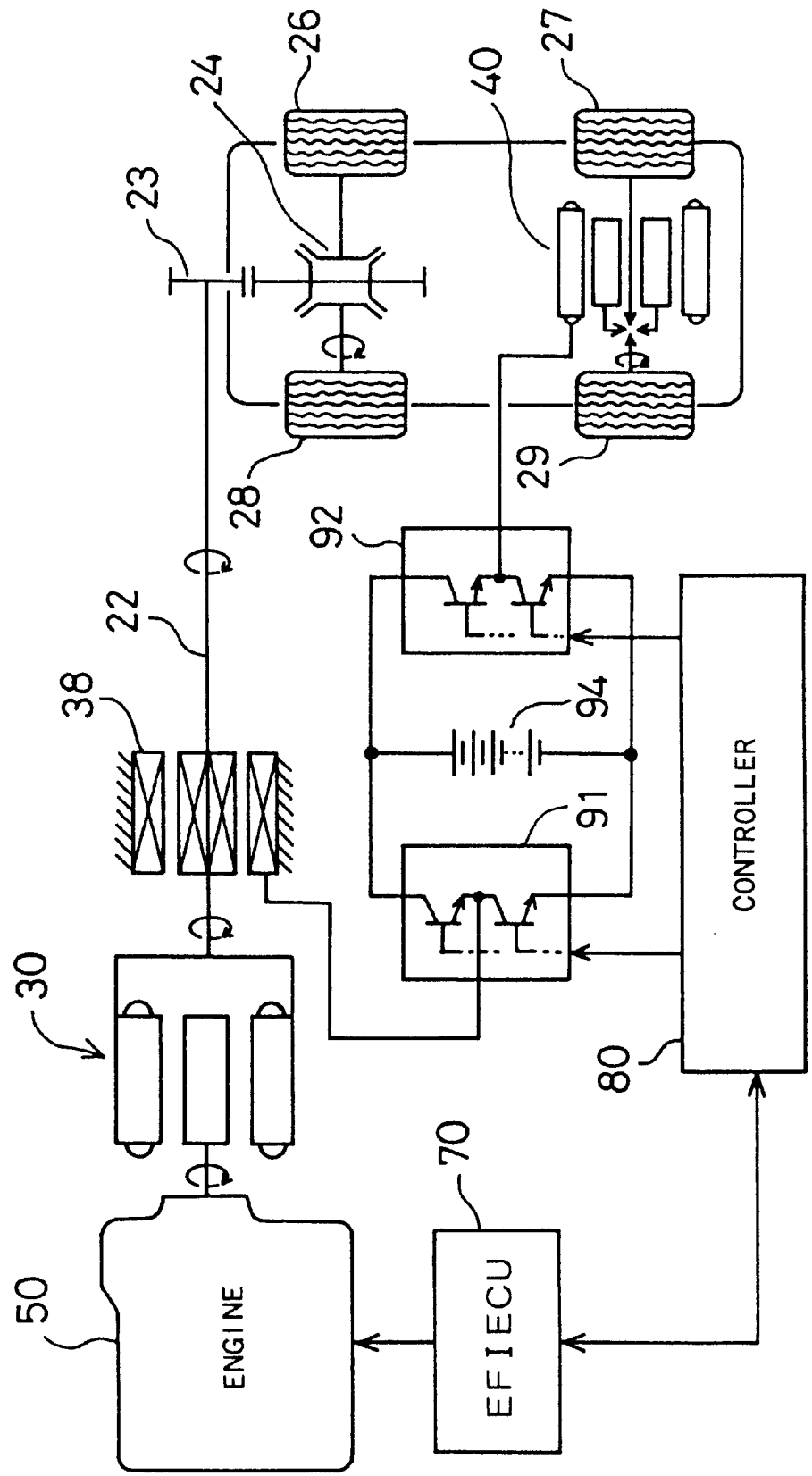
FIG. 31 shows an exemplified structure when the essential structure of the power output apparatus 20 of the first embodiment shown in FIG. 1 is applied to the vehicle with a four-wheel drive

For example, the power output apparatus 20 of the first embodiment shown in FIG. 1 may be applied to the vehicle with a four-wheel drive (4WD) as shown in FIG. 31. In the structure of FIG. 31, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23, so as to drive front driving wheels 26 and 28. The principle of the first embodiment can also be realized by this structure.

Other possible structures include a combination of the torque control process of the first embodiment with that of the third embodiment, a combination of the torque control process of the second embodiment with that of the third embodiment, and a combination of the torque control process of the first embodiment with that of the second embodiment and that of the third embodiment.

The gasoline engine driven by means of gasoline is used as the engine 50 in the above embodiments. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the above embodiments. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

The rotary transformer 38 used in the embodiments as means for transmitting the electric power to the clutch motor 30 may be replaced by a slip ring-brush contact, a slip ring-mercury contact, a semiconductor coupling of magnetic energy, or the like.

Transistor inverters are used for the first and the second driving circuits 91 and 92 of the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 94 in the above embodiments may include Pb cells, NIMH cells, Li cells, or the like cells. A capacitor may be used in place of the battery 94.

Although the power output apparatus is mounted on the vehicle in all the above embodiments, it may be mounted on other transportation means like trains as well as a variety of industrial machines.

It should be clearly understood that the above embodiments discussed above are only illustrative and not restrictive in any sense. The scope and spirit of the present invention are limited only by the terms of the appended claims.

What is claimed is:

1. A power output apparatus mounted on a vehicle for outputting power to a drive shaft of said vehicle, said power output apparatus comprising:

an engine having an output shaft;

engine-driving means for driving said engine;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said drive shaft;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

running state detection means for detecting a running state of said vehicle;

power prediction means for predicting an output state of the power to said drive shaft corresponding to a predetermined output state based on the running state of said vehicle detected by said running state detection means, said predetermined output state representing the output state accompanied by a process of charging said storage battery means with electric power that is equal to or greater than a predetermined electric power; and control means for, when said predetermined output state is predicted by said power prediction means, controlling said engine via said engine-driving means and controlling said first motor and said second motor via said first motor-driving circuit and said second motor-driving circuit, so as to allow said storage battery means to be charged at least with the predetermined electric power.

2. A power output apparatus in accordance with claim 1, wherein said power prediction means further comprises means for, when the running state of said vehicle detected by said running state detection means represents a state in which said vehicle is running on a slope having a predetermined or greater rising gradient, predicting that said predetermined output state would be expected in a predetermined time period.

3. A power output apparatus in accordance with claim 1, said power output apparatus further comprising:

position/direction detecting means having map information, said position/direction detecting means detecting a current position and a running direction of said vehicle in relation to said map information, wherein said power prediction means predicts said predetermined output state, based on the running state of said vehicle detected by said running state detection means and the current position and the running direction of said vehicle detected in relation to said map information by said position/direction detecting means.

4. A power output apparatus in accordance with claim 1, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said fourth rotor and said stator constituting said second motor.

5. A power output apparatus mounted on a vehicle for outputting power to a drive shaft of said vehicle, said power output apparatus comprising:

an engine having an output shaft;

engine-driving means for driving said engine;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said output shaft of said engine;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

running state detection means for detecting a running state of said vehicle;

power prediction means for predicting an output state of the power to said drive shaft corresponding to a predetermined output state based on the running state of said vehicle detected by said running state detection means, said predetermined output state representing the output state accompanied by a process of charging said storage battery means with electric power that is equal to or greater than a predetermined electric power; and control means for, when said predetermined output state is predicted by said power prediction means, controlling said engine via said engine-driving means and controlling said first motor and said second motor via said first motor-driving circuit and said second motor-driving circuit, so as to allow said storage battery means to be charged at least with the predetermined electric power.

6. A power output apparatus in accordance with claim 5, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said third rotor and said stator constituting said second motor.

7. A power output apparatus mounted on a vehicle for outputting power to a drive shaft of said vehicle, said power output apparatus comprising:

an engine having an output shaft;

engine-driving means for driving said engine;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said drive shaft;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

position/direction detecting means having map information, said position/direction detecting means detecting a current position and a running direction of said vehicle in relation to said map information;

power prediction means for predicting an output state of the power to said drive shaft corresponding to a predetermined output state based on the current position and the running direction of said vehicle detected in relation to said map information by said position/direction detecting means, said predetermined output state representing the output state accompanied by a process of charging said storage battery means with electric power that is equal to or greater than a predetermined electric power; and control means for, when said predetermined output state is predicted by said power prediction means, controlling said engine via said engine-driving means and controlling said first motor and said second motor via said first motor-driving circuit and said second motor-driving circuit, so as to allow said storage battery means to be charged at least with the predetermined electric power.

8. A power output apparatus in accordance with claim 7, wherein said map information of said position/direction detecting means comprises specific information regarding a specific area that generates said predetermined output state and requires said vehicle to run on a slope having a predetermined or greater rising gradient, said power prediction means further comprising means for, when the current position of said vehicle detected by said position/direction detecting means corresponds to the specific area that generates said predetermined output state and is included as the specific information in said map information, predicting that said predetermined output state would be expected in a predetermined time period.

9. A power output apparatus in accordance with claim 7, wherein said map information of said position/direction detecting means stores specific information regarding a specific area that generates said predetermined output state and requires said vehicle to run on a slope having a predetermined or greater rising gradient, said power prediction means further comprising means for, when said vehicle is expected to enter, in a predetermined time period, the specific area that generates said predetermined output state and is included as the specific information in said map information, based on the current position and the running direction of said vehicle detected by said position/direction detecting means, predicting that said predetermined output state would be expected in the predetermined time period.

10. A power output apparatus in accordance with claim 7, wherein said map information of said position/direction detecting means stores data regarding slopes on a driving route of said vehicle as specific information, said power prediction means further comprising means for, when said vehicle is running on a slope having a predetermined or greater rising gradient based on said map information and the current position and the running direction of said vehicle detected by said position/direction detecting means, predicting that said predetermined output state would be expected in a predetermined time period.

11. A power output apparatus in accordance with claim 7, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said fourth rotor and said stator constituting said second motor.

12. A power output apparatus mounted on a vehicle for outputting power to a drive shaft of said vehicle, said power output apparatus comprising:

an engine having an output shaft;

engine-driving means for driving said engine;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said output shaft of said engine;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

position/direction detecting means having map information, said position/direction detecting means detecting a current position and a running direction of said vehicle in relation to said map information;

power prediction means for predicting an output state of the power to said drive shaft corresponding to a predetermined output state based on the current position and the running direction of said vehicle detected in relation to said map information by said position/direction detecting means, said predetermined output state representing the output state accompanied by a process of charging said storage battery means with electric power that is equal to or greater than a predetermined electric power; and control means for, when said predetermined output state is predicted by said power prediction means, controlling said engine via said engine-driving means and controlling said first motor and said second motor via said first motor-driving circuit and said second motor-driving circuit, so as to allow said storage battery means to be charged at least with the predetermined electric power.

13. A power output apparatus in accordance with claim 12, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said third rotor and said stator constituting said second motor.

14. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said drive shaft;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

power-consuming means electrically connected with said first motor-driving circuit and said second motor-driving circuit, said power-consuming means consuming at least part of the electric power regenerated via at least one of said first motor-driving circuit and said second motor-driving circuit;

output state detecting means for detecting an output state of the power to said drive shaft by said engine, said first motor, and said second motor; and electric power control means for, when the output state of the power detected by said output state detecting means is accompanied by a process of charging said storage battery means with electric power that is greater than a predetermined electric power, controlling said first motor-driving circuit, said second motor-driving circuit, and said power-consuming means, in order to supply the predetermined electric power to said storage battery means which is thereby charged with the supplied electric power, while supplying a surplus power to said power-consuming means.

15. A power output apparatus in accordance with claim 14, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said fourth rotor and said stator constituting said second motor.

16. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said output shaft of engine;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

power-consuming means electrically connected with said first motor-driving circuit and said second motor-driving circuit, said power-consuming means consuming at least part of the electric power regenerated via at least one of said first motor-driving circuit and said second motor-driving circuit;

output state detecting means for detecting an output state of the power to said drive shaft by said engine, said first motor, and said second motor; and electric power control means for, when the output state of the power detected by said output state detecting means is accompanied by a process of charging said storage battery means with electric power that is greater than a predetermined electric power, controlling said first motor-driving circuit, said second motor-driving circuit, and said power-consuming means, in order to supply the predetermined electric power to said storage battery means which is thereby charged with the supplied electric power, while supplying a surplus power to said power-consuming means.

17. A power output apparatus in accordance with claim 16, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said third rotor and said stator constituting said second motor.

18. A power output apparatus for outputting power to a drive shaft, said power output apparatus comprising:

an engine having an output shaft;

engine-driving means for driving said engine;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said drive shaft;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

output state detecting means for detecting an output state of the power to said drive shaft by said engine, said first motor, and said second motor; and power control means for, when the output state of the power detected by said output state detecting means is accompanied by a process of charging said storage battery means with electric power that is greater than a predetermined electric power, controlling said engine via said engine-driving means and controlling said first motor and said second motor via said first motor-driving circuit and said second motor-driving circuit, in order to change the output state of the power to a specific state accompanied by a process of charging said storage battery means with electric power not greater than the predetermined electric power, without varying the power output to said drive shaft.

19. A power output apparatus in accordance with claim 18, wherein said power control means further comprises means for controlling said engine via said engine-driving means, in order to decrease a revolving speed of said output shaft without varying a torque output from said engine to said output shaft of said engine.

20. A power output apparatus in accordance with claim 18, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said fourth rotor and said stator constituting said second motor.

21. A power output apparatus for outputting power to a drive shaft, said power output apparatus comprising:

an engine having an output shaft;

engine-driving means for driving said engine;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said output shaft of said engine;

a second motor-driving circuit for driving and controlling said second motor;

storage battery means connected with said first motor-driving circuit and said second motor-driving circuit, said storage battery means being charged with electric power and discharged to release electric power via said first motor-driving circuit and said second motor-driving circuit;

output state detecting means for detecting an output state of the power to said drive shaft by said engine, said first motor, and said second motor; and power control means for, when the output state of the power detected by said output state detecting means is accompanied by a process of charging said storage battery means with electric power that is greater than a predetermined electric power, controlling said engine via said engine-driving means and controlling said first motor and said second motor via said first motor-driving circuit and said second motor-driving circuit, in order to change the output state of the power to a specific state accompanied by a process of charging said storage battery means with electric power not greater than the predetermined electric power, without varying the power output to said drive shaft.

22. A power output apparatus in accordance with claim 21, wherein said first motor and said second motor are constructed as a complex motor that comprises a third rotor connected with said output shaft of said engine, a fourth rotor connected with said drive shaft to be coaxial to and rotatable relative to said third rotor, and a stator for rotating said fourth rotor, said third rotor and said fourth rotor constituting said first motor comprising said first rotor and said second rotor whereas said third rotor and said stator constituting said second motor.

23. A method of controlling a power output apparatus mounted on a vehicle for outputting power to a drive shaft, said method comprising the steps of:

(a) providing an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor; a second motor connected with said drive shaft; and storage battery means being charged with electric power and discharged to release electric power by said first motor and said second motor;

(b) detecting a running state of said vehicle;

(c) predicting an output state of the power to said drive shaft corresponding to a predetermined output state based on the running state of said vehicle detected in said step (b), said predetermined output state representing the output state accompanied by a process of charging said storage battery means with electric power that is equal to or greater than a predetermined electric power; and (d) controlling said engine, said first motor, and said second motor, so as to allow said storage battery means to be charged at least with the predetermined electric power, when said predetermined output state is expected in said step (c).

24. A method of controlling a power output apparatus mounted on a vehicle for outputting power to a drive shaft, said method comprising the steps of:

(a) providing an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor; a second motor connected with said drive shaft; and storage battery means being charged with electric power and discharged to release electric power by said first motor and said second motor;

(b) detecting a current position and a running direction of said vehicle in relation to map information;

(c) predicting an output state of the power to said drive shaft corresponding a predetermined output state based on the current position and the running direction of said vehicle detected in relation to said map information in said step (b), said predetermined output state representing the output state accompanied by a process of charging said storage battery means with electric power that is equal to or greater than a predetermined electric power; and (d) controlling said engine, said first motor, and said second motor, so as to allow said storage battery means to be charged at least with the predetermined electric power, when said predetermined output state is expected in said step (c).

25. A method of controlling a power output apparatus mounted on a vehicle for outputting power to a drive shaft, said method comprising the steps of:

(a) providing an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor; a second motor connected with said drive shaft; storage battery means being charged with electric power and discharged to release electric power by said first motor and said second motor; and power-consuming means that can consume electric power;

(b) detecting an output state of the power to said drive shaft by said engine, said first motor, and said second motor; and (c) controlling said first motor, said second motor, and said power-consuming means, when the output state of the power detected in said step (b) is accompanied by a process of charging said storage battery means with electric power that is equal to or greater than a predetermined electric power, in order to supply the predetermined electric power to said storage battery means which is thereby charged with the supplied electric power, while supplying a surplus power to said power-consuming means.

26. A method of controlling a power output apparatus mounted on a vehicle for outputting power to a drive shaft, said method comprising the steps of:

(a) providing an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor; a second motor connected with said drive shaft; and storage battery means being charged with electric power and discharged to release electric power by said first motor and said second motor;

(b) detecting an output state of the power to said drive shaft by said engine, said first motor, and said second motor; and (c) controlling said engine, said first motor, and said second motor, when the output state of the power detected in said step (b) is accompanied by a process of charging said storage battery means with electric power that is equal to or greater than a predetermined electric power, in order to change the output state of the power to a specific state accompanied by a process of charging said storage battery means with electric power not greater than the predetermined electric power, without varying the power output to said drive shaft.

* * * * *